US011264002B2

(12) United States Patent
Ackerman et al.

(10) Patent No.: US 11,264,002 B2
(45) Date of Patent: Mar. 1, 2022

(54) METHOD AND SYSTEM FOR INTERACTIVE SONG GENERATION

(71) Applicant: WaveAI Inc., Sunnyvale, CA (US)

(72) Inventors: Margareta Ackerman, Sunnyvale, CA (US); David Loker, Sunnyvale, CA (US); Christopher Cassion, Sunnyvale, CA (US)

(73) Assignee: WaveAI Inc., Sunnyvale, CA (US)

( * ) Notice: Subject to any disclaimer, the term of this patent is extended or adjusted under 35 U.S.C. 154(b) by 0 days.

(21) Appl. No.: 17/278,655

(22) PCT Filed: Oct. 11, 2019

(86) PCT No.: PCT/US2019/055934
§ 371 (c)(1),
(2) Date: Mar. 22, 2021

(87) PCT Pub. No.: WO2020/077262
PCT Pub. Date: Apr. 16, 2020

(65) Prior Publication Data
US 2021/0312897 A1  Oct. 7, 2021

Related U.S. Application Data

(60) Provisional application No. 62/744,145, filed on Oct. 11, 2018.

(51) Int. Cl.
G10H 1/36 (2006.01)
G06N 20/00 (2019.01)
(Continued)

(52) U.S. Cl.
CPC ............. G10H 1/368 (2013.01); G06N 20/00 (2019.01); G10H 1/0025 (2013.01); G10L 13/02 (2013.01);
(Continued)

(58) Field of Classification Search
CPC ................ G10H 1/368; G10H 1/0025; G10H 2220/011; G10H 2220/101; G10H 2240/081; G06N 20/00; G10L 13/02
See application file for complete search history.

(56) References Cited

U.S. PATENT DOCUMENTS 10,510,328 B2 * 12/2019 Nazer .................... G06N 20/20
2003/0159566 A1  8/2003 Sater et al.
(Continued)

OTHER PUBLICATIONS

NPL_655, search report (Year: 2021).*
(Continued)

Primary Examiner — Jianchun Qin
(74) Attorney, Agent, or Firm — Cognition IP, P.C.; Edward Steakley

(57) ABSTRACT

A method and system may provide for interactive song generation. In one aspect, a computer system may present options for selecting a background track. The computer system may generate suggested lyrics based on parameters entered by the user. User interface elements allow the computer system to receive input of lyrics. As the user inputs lyrics, the computer system may update its suggestions of lyrics based on the previously input lyrics. In addition, the computer system may generate proposed melodies to go with the lyrics and the background track. The user may select from among the melodies created for each portion of lyrics. The computer system may optionally generate a computer-synthesized vocal(s) or capture a vocal track of a human voice singing the song. The background track, lyrics, melodies, and vocals may be combined to produce a complete song without requiring musical training or experience by the user.

19 Claims, 18 Drawing Sheets

(51) Int. Cl.
*G10H 1/00* (2006.01)
*G10L 13/02* (2013.01)
(52) U.S. Cl.
CPC . *G10H 2220/011* (2013.01); *G10H 2220/101* (2013.01); *G10H 2240/081* (2013.01)

(56) References Cited

U.S. PATENT DOCUMENTS

| | | |
|---|---|---|
| 2007/0074619 A1 | 4/2007 | Vergo |
| 2008/0172137 A1 | 7/2008 | Safina |
| 2008/0184870 A1 | 8/2008 | Toivola |
| 2008/0215599 A1 | 9/2008 | Yun |
| 2009/0217805 A1 | 9/2009 | Lee et al. |
| 2013/0019738 A1 | 1/2013 | Haupt et al. |
| 2016/0255025 A1* | 9/2016 | Valverde .................. H04L 51/32 715/716 |
| 2017/0091322 A1* | 3/2017 | Agrawal ............. G06F 16/3346 |

OTHER PUBLICATIONS

International Search Report in International Application No. PCT/US2019/055934, dated Jan. 6, 2020.
M. Ackerman et al., Algorithmic songwriting with alysia, Dec. 4, 2016.

* cited by examiner

METHOD AND SYSTEM FOR INTERACTIVE SONG GENERATION

CROSS-REFERENCE TO RELATED APPLICATIONS

This application is a 35 U.S.C. § 371 national stage application of PCT International Application No. PCT/US2019/055934, filed on Oct. 11, 2019, which claims the benefit of U.S. Provisional Application No. 62/744,145, filed on Oct. 11, 2018, the contents of which are incorporated herein.

BACKGROUND

The current process for composing songs is entirely manual, requiring the composer to come up with all the elements of a song. The process tends to require a great deal of musical training and experience, and individuals without musical training generally cannot compose songs using the current manual methods. There is a lack of technological tools for allowing people with no musical experience to easily create original songs. For example, there do not exist tools for breaking down the composition process into smaller pieces that allow for composition and sonification by combining computer-suggested elements.

SUMMARY

Some of the disclosure herein relates to a system and method for generating a song using an interactive process with a computer system. In some embodiments, the song includes a vocal or lyrical element.

One embodiment relates to a method of generating a song, including displaying a set of suggested lyrics. A computer system repeatedly receives input of one or more lyrics from a user and regenerates the set of suggested lyrics based on the input lyrics, until a set of lyrics for the song is received. The computer system generates a set of melodies that match the received set of lyrics. The computer system receives a selection of one or more melodies from the user from the set of melodies. The computer system combines the selected melodies and received set of lyrics to create the song. The computer system then plays the song.

One embodiment relates to a method of generating a song, including receiving selection of a musical genre, background track, and topic, or a subset thereof. A computer system generates a set of suggested lyrics that may be based on any of the selected musical genre, selected background track, and selected topic. The computer system displays the suggested lyrics. The computer system repeatedly receives input of one or more lyrics from a user and regenerates the set of suggested lyrics based on the input lyrics, until a set of lyrics for the song is received. The computer system generates a set of melodies based on the selected musical genre, selected background track, selected topic, and received set of lyrics. The computer system receives a selection of a melody from the set of melodies. The computer system combines the selected melody, selected background track, and received set of lyrics to create the song. The computer system plays the song.

One embodiment relates to a method of generating a song including selecting a background track, and a computer system generating a set of melodies that fit with the background track. The computer system receives a selection of a background track from a user. Based on the selected background track, the computer system may create one or more vocal melodies that are harmonious with the background track. The computer system may optionally generate a computer-synthesized vocal track or capture a vocal track of a human voice singing the song. The computer system combines the selected background track and melodies to create the song. The computer system may then play the song.

One embodiment relates to a method of generating a song and receiving selection of a genre and topic. A computer system receives a selection of a genre. The computer system may also receive selection of a topic. The computer system may then generate a background track, lyrics, and one or more vocal melodies based on the selection of the genre and topic. In some embodiments, the generated examples are suggestions displayed to the user for selection. In other embodiments, the generated examples are used by the computer system without requiring selection by the user. The computer system combines the melody, background track, and lyrics to create the song. The computer system may then play the song.

One embodiment relates to a method for generating a song, including: displaying options for selection of a musical genre on a screen of a computer system; receiving selection of a musical genre from a user; displaying options for selection of a background track on a screen of a computer system; receiving selection of a background track from the user, wherein the background track is associated with one or more parts of the song; displaying options for selection of a topic on a screen of a computer system; receiving selection of a topic from the user; displaying the one or more parts of the song; receiving a selection of one of the parts for editing by the user; displaying one or more user interface elements for inputting a line of the song; generating a set of suggested lyrics based on the selected musical genre, selected background track, and selected topic, and displaying the suggested lyrics; repeatedly receiving input of at least one line of the song from the user and re-generating the set of suggested lyrics based on the input line from the user, until a set of lyrics for the selected one or more parts of the song is received; generating a set of melodies based on the selected musical genre, selected background track, selected topic, and received set of lyrics; displaying options for selection of a melody on a screen of a computer system; receiving selection of a melody from the user, wherein the melody is associated with one or more parts of the song; saving the song to a database.

Other embodiments herein will be made clear from the detailed disclosure.

BRIEF DESCRIPTION OF THE DRAWINGS

The present disclosure will become better understood from the detailed description and the drawings, wherein.

DETAILED DESCRIPTION

Figure 1:
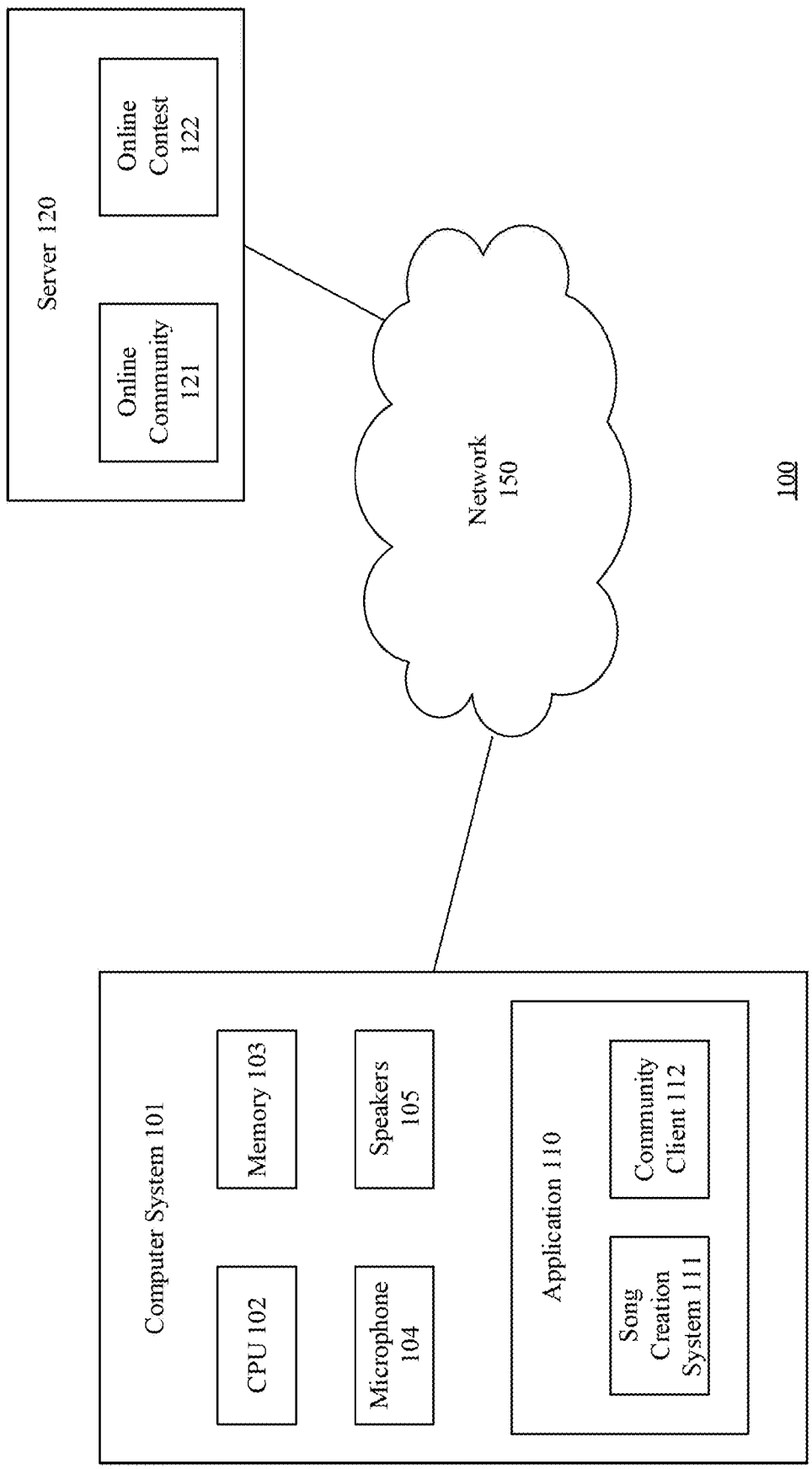
FIG. 1 illustrates an exemplary network environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein. In some embodiments, the computer system may incorporate elements of artificial intelligence (AI) or machine learning (ML). In other embodiments, non-AI and non-ML techniques are used.

FIG. 1 illustrates an exemplary network environment 100 in which some embodiments may operate. Computer system 101 may be provided to perform aspects related to generating a song. The computer system 101 may comprise, for example, a smartphone, smart device, smart watch, tablet, desktop computer, laptop computer, notebook, server, or any other processing system. In some embodiments, the computer system 101 is mobile so that it fits in a form factor that may be carried by a user. In other embodiments, the computer system 101 is stationary. The computer system 101 may include a CPU 102 and memory 103. The computer system 101 may include internal or external peripherals such as a microphone 104 and speakers 105. The computer system may also include song generation application 110, which may comprise a song creation system 111 and a community client 112.

The computer system 101 may be connected to a network 150. The network 150 may comprise, for example, a local network, intranet, wide-area network, internet, the Internet, wireless network, wired network, Wi-Fi, Bluetooth, a network of networks, or other networks. Network 150 may connect a number of computer systems to allow inter-device communications. Server 120 may be connected to computer system 101 over the network 150. The server 120 may comprise an online community 121 and an online contest 122.

Figure 2A:
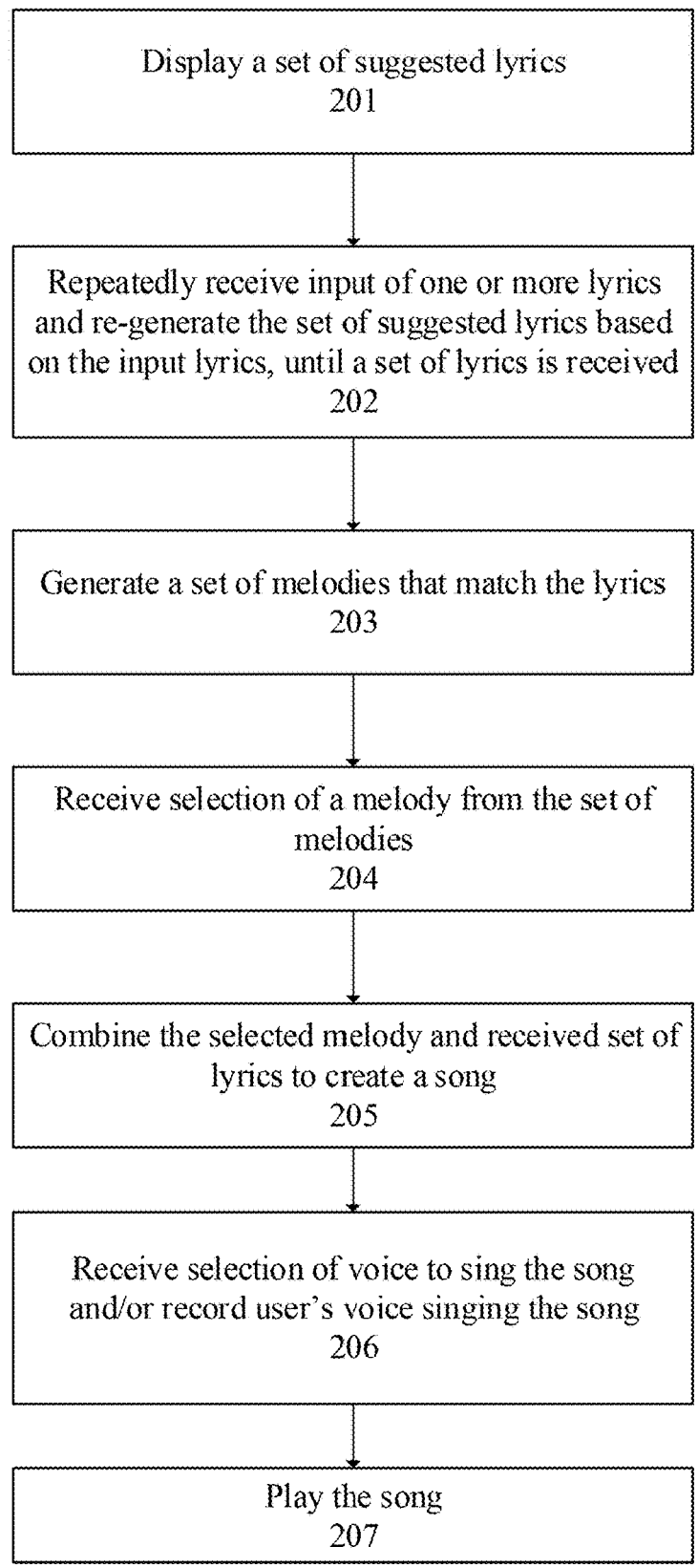
FIG. 2A illustrates an exemplary computer-implemented method for generating a song.

FIG. 2A illustrates an exemplary computer-implemented method 200 for generating a song in an embodiment. In some embodiments, the method 200 is performed by computer system 101. In step 201, the computer system 101 displays a set of suggested lyrics to a user. The suggested lyrics may be generated based on various criteria discussed further herein. In some embodiments, the suggested lyrics are generated based on an artificial intelligence, machine learning-based system. In other embodiments, the suggested lyrics are generated by a rule-based system that uses deterministic rules to produce outputs based on inputs.

In step 202, the computer system 101 repeatedly receives input of one or more lyrics from a user and re-generates the set of suggested lyrics based on the input lyrics. The process may continue until a set of lyrics for the entire song, or a portion thereof, is received. The inputs of the lyrics from the user may be free text inputs, selections, such as from a set of options or drop down menu, voice inputs, gesture inputs, or any other form of input. The inputs of the lyrics may be received in various units of input, such as one line at a time, one word at a time, one phrase at a time, one clause at a time, one verse at a time, multiple lines at a time, multiple words at a time, multiple phrases at a time, multiple clauses at a time, or multiple verses at a time. After the computer system 101, receives lyrics of the song in the form of one of these units of input, the computer system 101 may re-generate the suggested lyrics while taking into account the previously input lyrics from the user. The lyric suggestions may be presented in the same units as the input from the user, or in different units. The suggestions may be, for example, one line, one word, one phrase, one clause, one verse, multiple lines, multiple words, multiple phrases, multiple clauses, or multiple verses.

The computer system 101 may modify the suggested lyrics in many ways, based on the prior inputs. The computer system 101 may revise the suggested lyrics to remove lyrics that would be redundant or duplicative with lines that have been entered. The suggested lyrics may also be based on a topic selected by a user. The computer system 101 may revise the suggested lyrics to propose lyrics that logically follow from the previously entered lyrics, such as lyrics that naturally follow in a narrative or relate to the same or a similar topic. The computer system 101 may revise the suggested lyrics to suggest lyrics that rhyme, that fit a selected rhyming pattern, that have a desired number of syllables, words, or phrases, or follow other poetic or song-writing conventions as compared to previously entered lines.

In step 203, after the lyrics for the song have been received, the computer system 101 generates a set of melodies that match the set of lyrics. The melodies may be created for small units of text such as individual sentences, verses, stanzas, lines, and so on. The melodies may be generated to correspond to the lyrics that have been entered, so that when the lyrics are sung according to the melody a harmonious result is achieved. In some embodiments, the set of melodies are generated based on an artificial intelligence, machine learning-based system. In other embodiments, the set of melodies are generated by a rule-based system that uses deterministic rules to produce outputs based on inputs. In some embodiments, the suggestions for melodies may be hardcoded or taken from a database. For example, a database may have lyrics associated with specific melodies, so that when a lyric is selected, the associated melodies are shown as suggestions. Similarly, pre-specified relationships, through a database or otherwise, may be made between both lyrics and backgrounds tracks and melodies, so that when certain combinations of lyrics and backgrounds are chosen, specific melodies are suggested based on the combination of lyric and background track.

In step 204, the computer system 101 may receive a selection of a melody from the set of melodies. This selection may be received in response to user input such as text input, user interface interactions, button presses or taps, voice commands, and so on. In response, the desired melody is selected. After selection of a melody, the generation of future melodies may be based on the past selected melodies and lyrics.

In step 205, the computer system 101 combines the selected melody and received set of lyrics to create the song. The selected melody and the received lyrics may be synched so that the lyrics are displayed or sung at the corresponding times that the melody is played. In step 207, the computer system 101 may play the song. In addition, the song may be stored in memory, such as in a local database or remote database of songs.

It should be understood that steps described herein with respect to method 200 and other methods are optional, and some steps may be omitted and others may be added. Moreover, steps may be performed in different orders than illustrated herein. By way of example, it is not required that lyrics received before the melody and that the melody be generated from the lyrics. Vice versa, a melody may be selected (through the iterative process) or provided directly by the user, and a set of lyrics may be generated from the melody. In other embodiments, lyrics and melodies may be suggested together by the computer system to enable the user to make a selection of a lyric and melody option. Furthermore, additional selections may be received from a user, such as a background track or topic, or additional parameters may be generated based on other inputs. The computer system's suggestions may be made based on some or all of the selections made by the user or the lyrics and/or melodies.

Figure 2B:
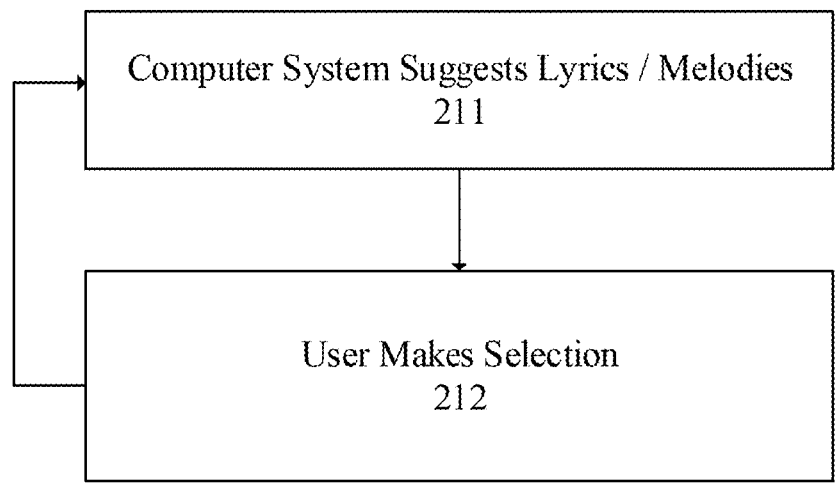
FIG. 2B illustrates an exemplary computer-implemented method for iterative generation of lyrics or melodies.

FIG. 2B illustrates the exemplary computer-implemented method for iterative generation of lyrics or melodies, which was described in detail above. In step 211, the computer system suggests lyrics or melodies to a user. In step 212, a selection is received from the user of lyrics or melodies from the suggested options. In response to the selection, the computer updates its suggestions to take into account the prior selections and, optionally, other parameters like background, topic, genre, and so on.

Figure 3A:
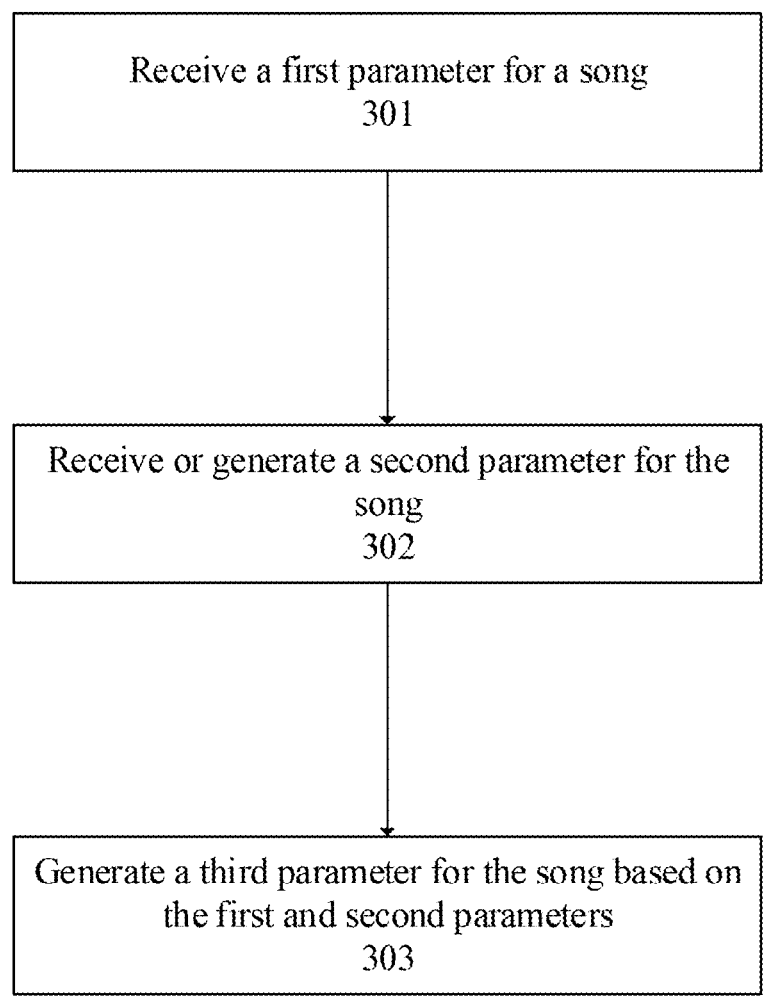
FIG. 3A illustrates an exemplary computer-implemented method for generating a song.

FIG. 3A illustrates an exemplary computer-implemented method 300 for generating a song in an embodiment. In some embodiments, the method 300 is performed by computer system 101. Method 300 relates to generating a song by combining parameters, where one or more of the later parameters may be generated by the computer system 101 based on parameters selected earlier in the process. Parameters may be, for example, the background track, melody, and lyrics of a song.

In step 301, the computer system 101 receives input of a first parameter. The first parameter may be received by free text inputs, selections, such as from a set of options or drop down menu, voice inputs, gesture inputs, or any other form of input.

In step 302, the computer system 101 receives input of a second parameter, or the second parameter is generated in full or in part based on the first parameter by the computer system 101. The second parameter may be received by any of the input methods specified herein, such as in step 301. When the second parameter is generated, it may be generated based on the first parameter. In embodiments where the second parameter is generated, it may be generated by an artificial intelligence, machine learning-based system or by a rule-based system using deterministic rules. In some embodiments, the second parameter is generated by the computer system by selection from a hardcoded list of options or database. For example, in some embodiments a hardcoded list of rules may relate the second parameter to the first parameter. Each value for the first parameter may have a hardcoded set of values of the second parameter that are associated, or the associations may be specified in a database. Upon selection of the first parameter, the associated list for the second parameter may be displayed to the user.

In step 303, the third parameter is generated in full or in part by the computer system 101. The third parameter may be generated based on the first parameter and second parameter. The third parameter may be generated by an artificial intelligence, machine learning-based system or by a rule-based system using deterministic rules.

By way of example, in some embodiments, a background track and lyrics may be selected based on user input and a melody generated based on the background track and lyrics. Vice versa, the lyrics and melody may be instead selected and the background track generated from those items. Similarly, as described above, the second parameter may fully or partly generated by the computer system 101. In some embodiments, a background track may be selected based on user input, a set of lyrics generated based on the background track, and a melody generated based on the background track and lyrics. In other embodiments, lyrics may be initially selected, then a melody generated based on the lyrics, and finally a background track generated based on the lyrics and the melody.

It should be understood that the first parameter, second parameter, and third parameter may be any of the background track, lyrics, or melody. Other parameters may also be used. Any of these parameters may be fully or partly generated based on one or two of the other parameters, for example, by using an artificial intelligence, machine-learning based system or by using a rule-based system.

Figure 3C:
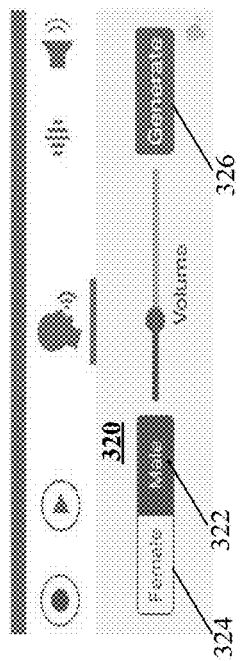
FIG. 3C illustrates an exemplary user interface portion that may be used in some embodiments for a karaoke mode.
Figure 3B:
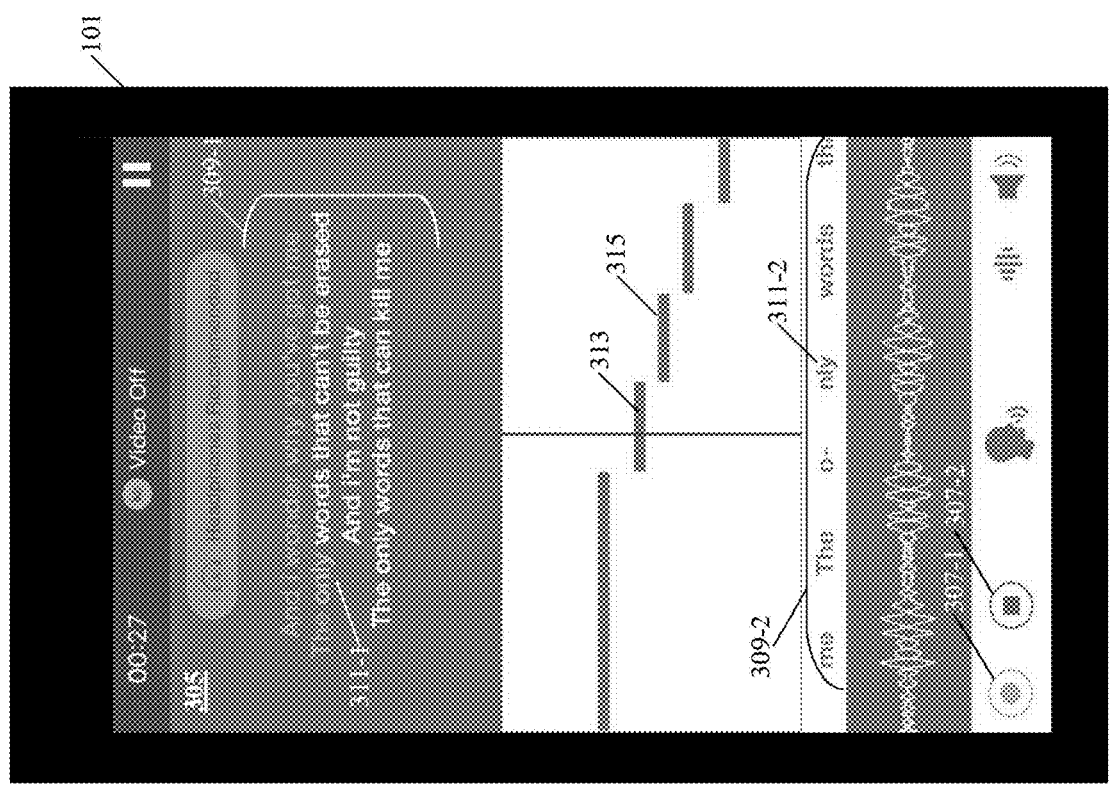
FIG. 3B illustrates an exemplary user interface that may be used in some embodiments for a karaoke mode.

FIG. 3B illustrates an exemplary user interface that may be used in some embodiments for a karaoke mode. In one embodiment, the song creation system 111 may include a karaoke mode interface 305 that allows the user to sing the vocal track for a generated song (i.e. a micro-song and/or a full-length song). In an embodiment, the karaoke mode may be added in method 200 such as optional step 206 or in method 400 such as optional step 416, where (for example) a type of voice is selected to sing the song, such as a type of computer-synthesized voice that will be used to generate a vocal track for the song. In some embodiments, the voice selection of step 206 and step 416 may be recording (i.e. capturing) a vocal track of the user singing the song or a selection for a combination that includes concurrently capturing the user's vocal track and generating the computer-synthesized vocal track of one or more computer-synthesized voices singing the song. In some embodiments, the vocal track of the user singing the song may be captured at a computing device (such as a smartphone recording the user singing the song) or may be included in one or more files uploaded to the system. In the karaoke mode, the computer system 101 may present an interface 305 to the user that includes a start button 307-1 or record button 307-2. It is further understood the optional steps 206 and 415 regarding voice selection can be performed at various points of time during any of the embodiments described herein. Upon pressing the start button 307-1, the song (including the background track and melody) may begin to play and a portion(s) of the corresponding lyrics 309-1 may be displayed as the song is played. A word(s) 311-1 within the displayed lyric portion 309-1 may be highlighted as a visual cue to the user to prompt when the user should be singing the word or phrase that is represented by the highlighted portion 311 of the lyrics 309-1. Furthermore, a syllable(s) 311-2 of the highlighted lyric portion 311-1 is presented in the interface 305 as part of a scrolling representation of a segment(s) of the lyrics 309-2. The syllable 311-2 is concurrently displayed with a corresponding horizontal line representations 313, 315 of one or more notes of the song. Such concurrent display of the syllable 311-2 in the scrolling lyrics 309-2 with the horizontal lines 313, 315 indicates to the user a musical timing and a pitch and/or a tone of musical notes at which the syllable 311-2 should be physically sung by the user. The computer system 101 may also initiate recording by the microphone 104 to record the singing of the user in response to the user selecting the record button 307-1. The recording may stop when the end of the song is reached. The recorded audio of the user singing may then be stored as a vocal track for the song. The karaoke recording may be processed by an enhancement component to apply autotuning or other enhancements. Thus, a complete song (i.e. a complete micro-song and/or a complete full-length song) may be created by combining at least a melody, background track, and vocals. The complete song may then be played back with the melody, background track, and vocals.

Figure 4A:
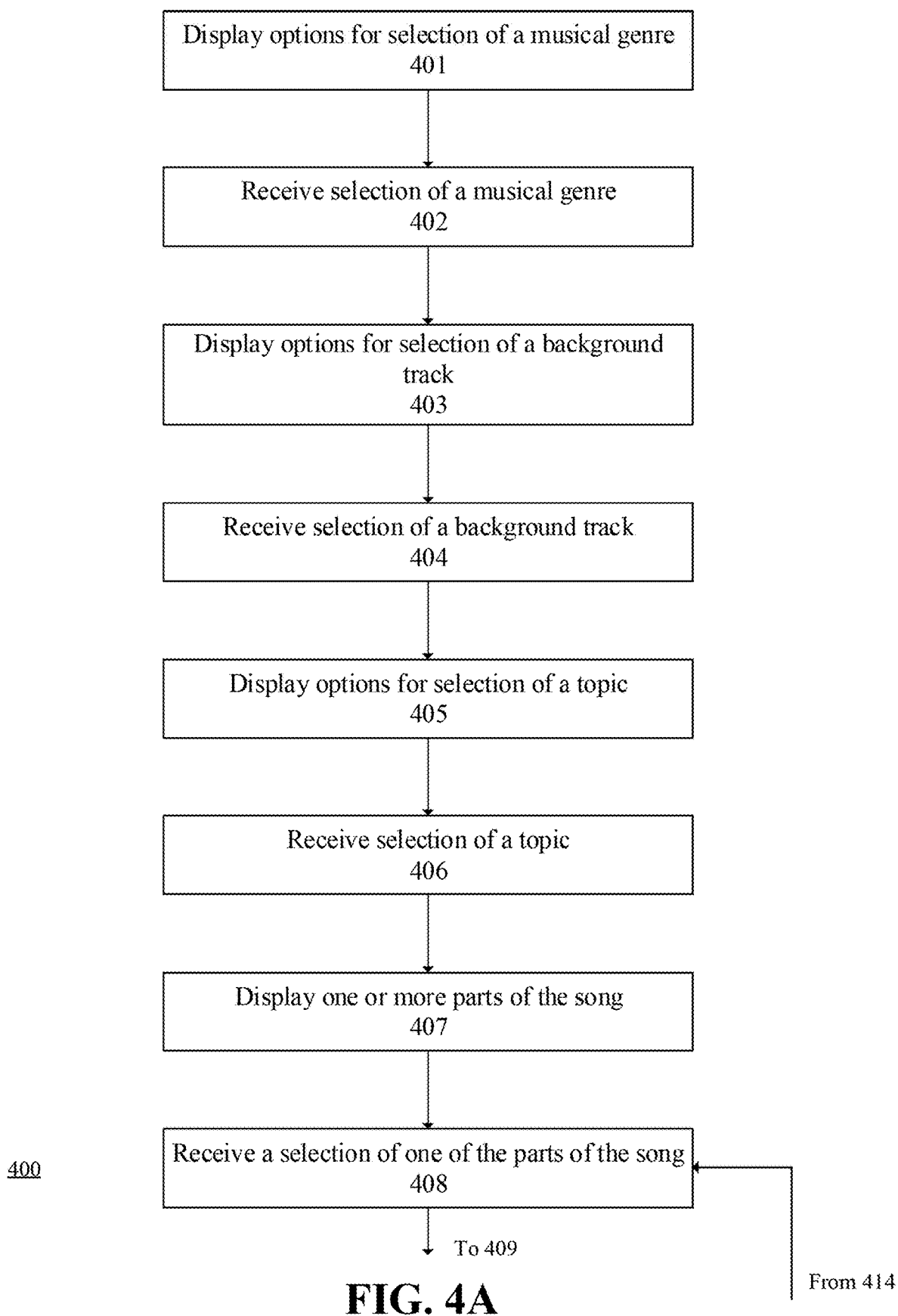
FIGS. 4A-B illustrate an exemplary computer-implemented method for generating a song.
Figure 4B:
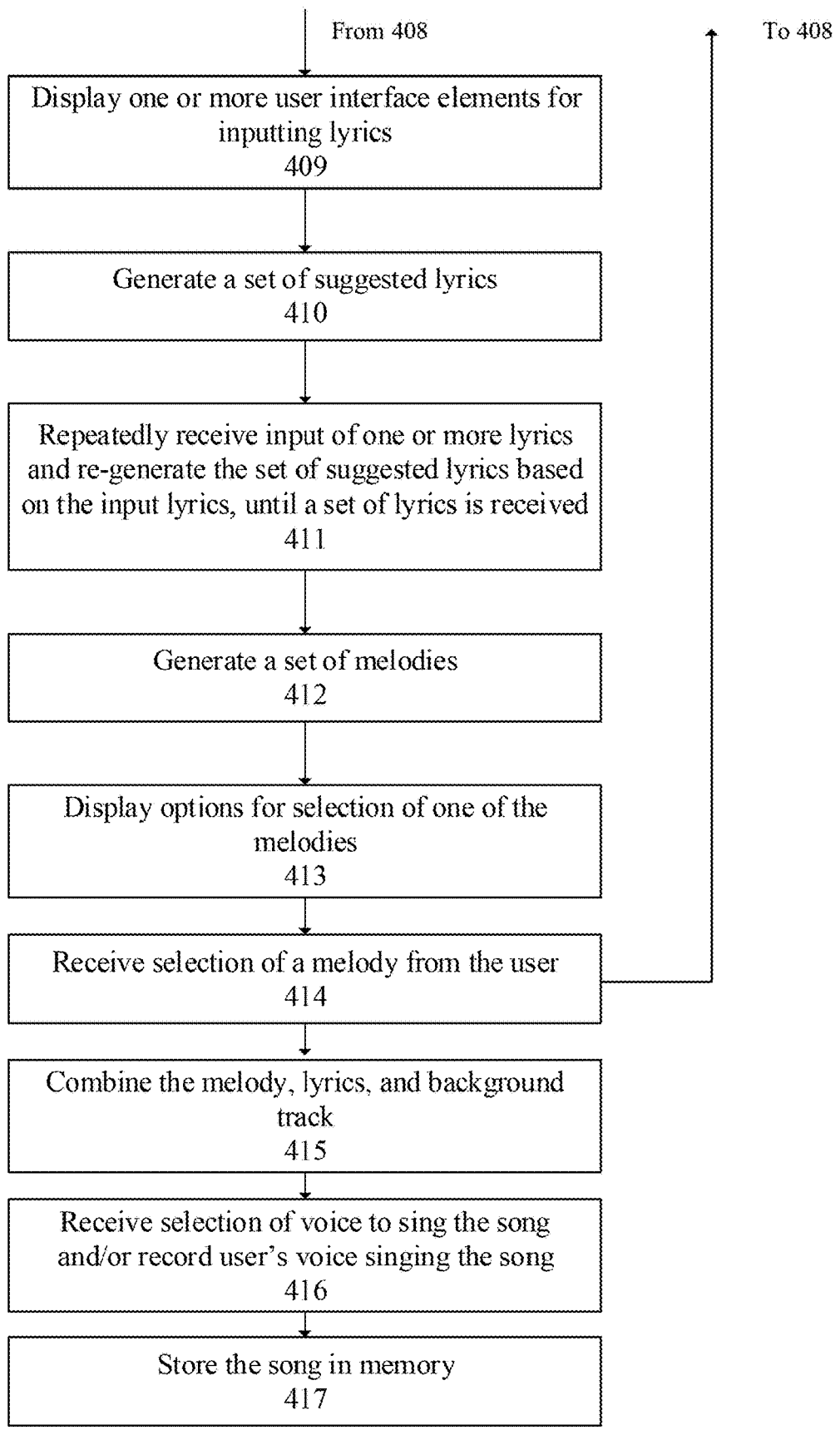

FIGS. 4A-B illustrate an exemplary computer-implemented method 400 for generating a song in an embodiment. In some embodiments, the method 400 is performed by computer system 101. Method 400 illustrates a detailed process of steps for generating a song. It should be understood that each of these steps is optional and not required and merely illustrates one embodiment of a process of song generation. Moreover, the steps may be performed in any order.

In step 401, computer system 101 displays on a screen options for selection of a musical genre to user. Musical genres may include, for example, pop, rock, country, rap, R&B, soul, jazz, classical, and other genres.

In step 402, the computer system 101 receives a selection of a musical genre from a user. The selection of the musical genre may be by free text inputs, selections, such as from a set of options or drop down menu, voice inputs, gesture inputs, or any other form of input.

In step 403, the computer system 101 displays options for selection of a background track. The computer system 101 may store background tracks in a local memory or retrieve them from a remote database. The background tracks may be automatically generated by an algorithm, aggregated from other databases of background tracks, or crowd sourced by uploads from users. The background tracks may be tagged according to the musical genre, so that the computer system 101 may select appropriate background tracks to display to the user based on the selected musical genre. The computer system 101 may also take into account other factors in determining which ones to display to the user, such as popularity, number of upvotes or downvotes, past selections of background tracks by the user, and other factors.

In step 404, the computer system 101 may receive a selection of a background track from the user. The selection of the background track may be by free text inputs, selections, such as from a set of options or drop down menu, voice inputs, gesture inputs, or any other form of input. The background track may include data about parts of a song that are associated with the background track. For example, the arrangement of the background track may include space for a verse, chorus, bridge, intro, coda, or other parts of a song. The arrangement of the background track may be define which parts the final song will have. For example, a background track may be arranged for the song to have a verse, chorus, verse, chorus or intro, verse, bridge, chorus, or any other arrangement.

In step 405, the computer system 101 may display options for selection of a topic. Topics may be, for example, emotions such as love, hate, sad, longing, or others. Topics may also be semantic and determine what the song is about, such as time, breakups, unrequited love, or other topics. These are just examples and any other kinds of topics may be used. In some embodiments, free text input in the form of arbitrary words or phrases may be received from the user as a topic.

In step 406, the computer system 101 may receive a selection of a topic from the user. The selection of the topic may be by free text inputs, selections, such as from a set of options or drop down menu, voice inputs, gesture inputs, or any other form of input.

In step 407, the computer system 101 may display the one or more parts of the song to the user, for the user to select part of the song to edit. In some embodiments, the parts of the song may be determined by the background track.

In step 408, the computer system 101 may receive a selection of one of the parts of the song to edit. The selection of the part of the song may be by free text inputs, selections, such as from a set of options or drop down menu, voice inputs, gesture inputs, or any other form of input.

In step 409, the computer system 101 may display one or more user interface elements for inputting lyrics of the song. The user interface elements may be, for example, free text inputs, selections, such as from a set of options or drop down menu, voice inputs, gesture inputs, or any other user interface elements or a combination of user interface elements. The user interface elements may be configured to receive the lyrics in various units of input, such as one line at a time, one word at a time, one phrase at a time, one clause at a time, one verse at a time, multiple lines at a time, multiple words at a time, multiple phrases at a time, multiple clauses at a time, or multiple verses at a time.

In step 410, the computer system 101 may generate a set of suggested lyrics, which may be based on prior inputs including the selected musical genre, selected background track, and selected topic. These suggested lyrics may be displayed. In some embodiments, the suggested lyrics may be displayed in a list, with different suggested lyrics selectable by the user for adding to the song. The suggested lyrics may be ranked with more popular or likely lyrics listed ahead of less popular or likely lyrics. In some embodiments, the suggested lyrics are generated based on an artificial intelligence, machine learning-based system. In other embodiments, the suggested lyrics are generated by a rule-based system that uses deterministic rules to produce outputs based on inputs. In other embodiments, the suggested lyrics may be selected from a list or database of lyrics that are stored internally to the song creation system 111. The lyric suggestions may be presented in the same units as the input from the user, or in different units. The suggestions may be, for example, one line, one word, one phrase, one clause, one verse, multiple lines, multiple words, multiple phrases, multiple clauses, or multiple verses.

In step 411, the computer system 101 repeatedly receives input of one or more lyrics from a user and re-generates the set of suggested lyrics based on the input lyrics. The process may continue until a set of lyrics for the entire song, or a portion thereof, is received. The inputs of the lyrics from the user may be free text inputs, selections, such as from a set of options or drop down menu, voice inputs, gesture inputs, or any other form of input. The inputs of the lyrics may be received in various units of input, such as one line at a time, one word at a time, one phrase at a time, one clause at a time, one verse at a time, multiple lines at a time, multiple words at a time, multiple phrases at a time, multiple clauses at a time, or multiple verses at a time. The inputs of lyrics may be caused by selection, and therefore acceptance, of lyrics that were suggested by the system, or may be new lyrics that are entered by the user and do not correspond to a suggestion. After the computer system 101, receives lyrics of the song in the form of one of these units of input, the computer system 101 may re-generate the suggested lyrics while optionally taking into account the previously input lyrics from the user. The re-generation of suggested lyrics may also take into account prior inputs such as the selected musical genre, selected background track, and selected topic. The re-generation of the lyrics may be based on an artificial intelligence, machine learning-based system or based on a rule-based system.

In step 412, the computer system 101 may generate a set of melodies based on the selected musical genre, selected background track, selected topic, and received set of lyrics. The melodies may be generated to correspond to the lyrics that have been entered, and the background track, so that when the lyrics are sung according to the melody and the background track is played, a harmonious result is achieved. In some embodiments, the set of melodies are generated based on an artificial intelligence, machine learning-based system. In other embodiments, the set of melodies are generated by a rule-based system that uses deterministic rules to produce outputs based on inputs. In other embodiments, melodies are taken from a database. Generation of melodies is optional, and some embodiments do not include melodies, such as some embodiments for generating rap songs.

In step 413, the computer system 101 may display options for selection of one of the melodies by the user. The notes of the melodies may be displayed to provide a visual representation of the melodies to the user. In addition, user interface elements for playing the melodies may also be displayed to allow the user to play the melodies and hear them before making a selection. Selection of melodies is optional, and some embodiments do not include melodies, such as some embodiments for generating rap songs.

In step 414, the computer system 101 receives selection of a melody from the user. This selection may be received in response to user input such as text input, user interface interactions, button presses or taps, voice commands, and so on. In response, the desired melody is selected. In an embodiment, the compute system 101 may provide the user with a pre-selected melody (or default melody) and the user may be able to select alternate melodies or apply one or more modifications to the pre-selected melody or default melody.

Optionally, the process may be repeated at step 408 to generate lyrics and a melody for other parts of the song. The process may continue until lyrics and a melody are generated for each of the parts of the song, or another stopping condition is reached. The suggestion and generation of lyrics and melodies for subsequent song parts may depend on selections made for prior song parts. For example, the generated melodies of a second verse, may be based on melodies generated for the first verse. For example, the melodies of the second verse may borrow from or be similar to the melodies of the prior verse. Any of the melody and lyric suggestions made for a song part may depend on prior selections and inputs made for the same part and/or other parts of the song.

In step 415, the computer system 101 combines the melody and lyrics for each part of the song, and each of the parts of the song are combined with the background track so that the entire song is created. The melody and lyrics may be synched so that the lyrics are displayed or sung at the corresponding times that the melody is played.

In step 416, the computer system 101 stores the song in memory, such as in a local database or remote database of songs. The computer system 101 may also play the song to the user or other users.

Figure 5A:
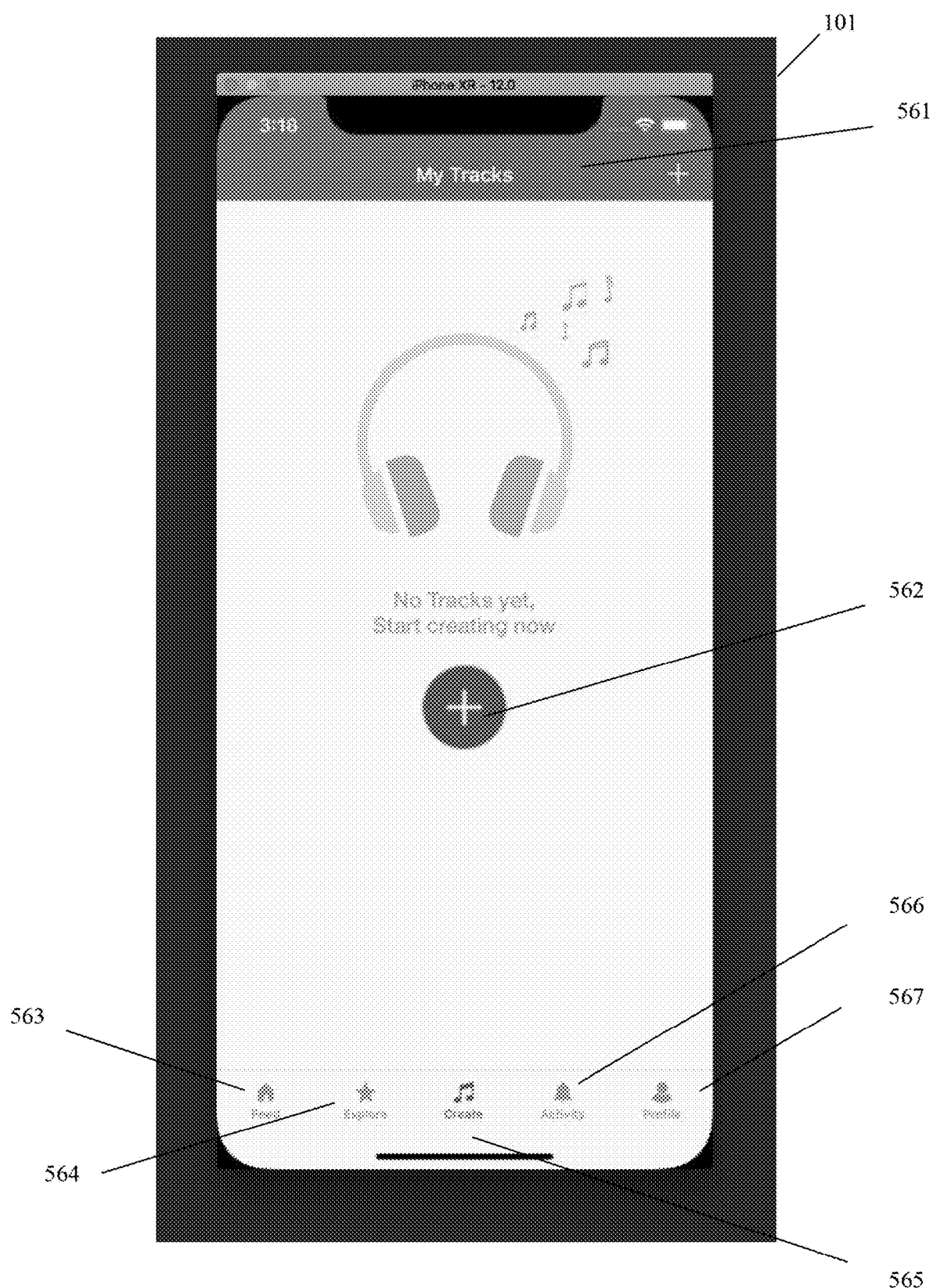
FIG. 5A illustrates an exemplary user interface that may be used in some embodiments for initiating a song creation process.

FIG. 5A illustrates an exemplary user interface that may be used in some embodiments for initiating a song creation process. In an embodiment, the computer system 101 is a smartphone. In one exemplary interface, a selection of tracks is displayed to the user. A label 561 is shown to prompt the user to select a track or create a new track. A start button 561 may be used to initiate the song creation process. Menu buttons include a home button 563, an explore button 564, a create button 565, an activity button 566, and a profile button 567.

Figure 5B:
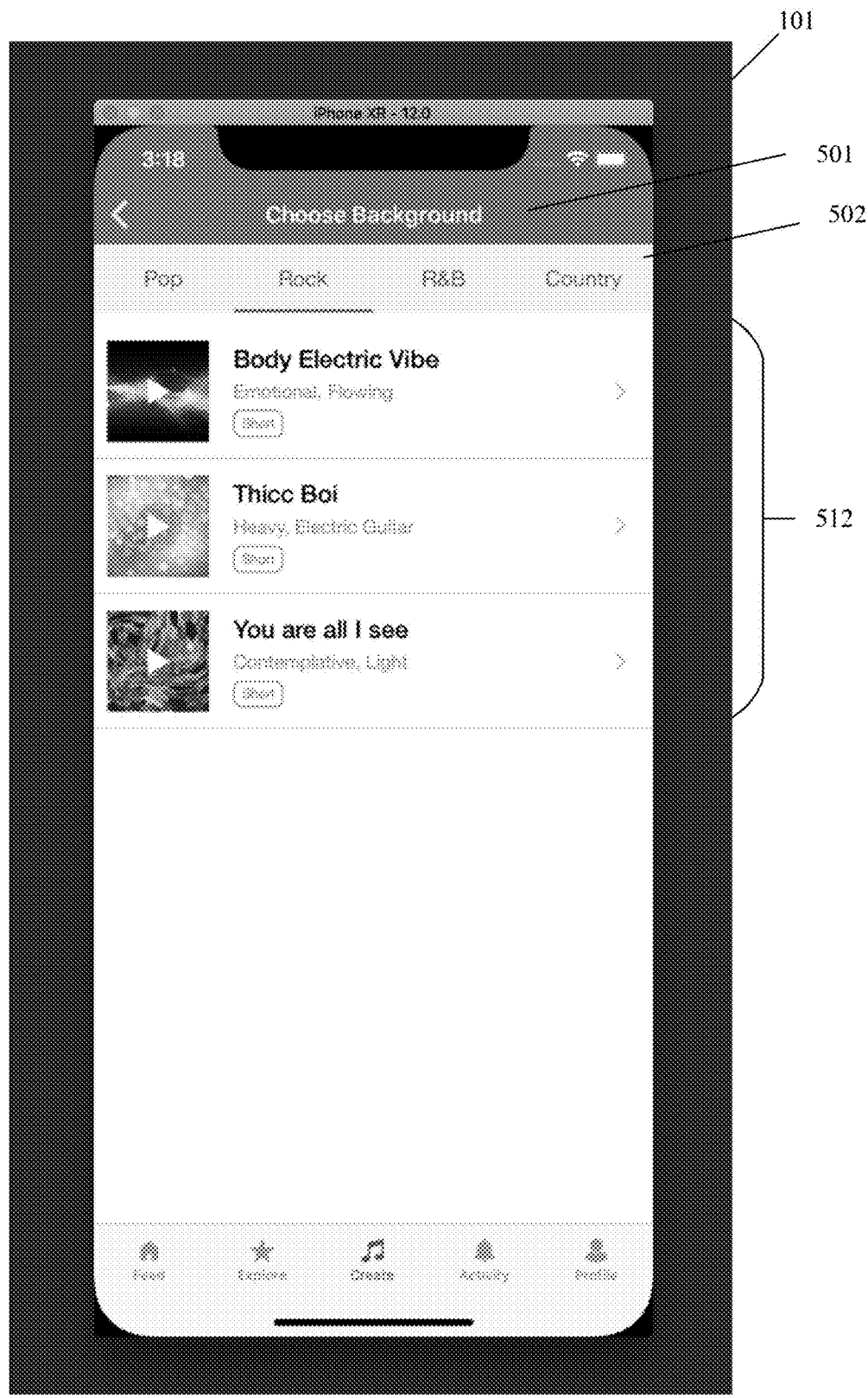
FIG. 5B illustrates an exemplary user interface that may be used in some embodiments for selection of a musical genre and background track.

FIG. 5B illustrates an exemplary user interface that may be used in some embodiments for selection of a musical genre and background track. In one exemplary interface, a label 501 is shown prompt the user to select a background track. A menu of musical genres 502 is shown allowing the user to select a desired genre or other song type, such as "holiday", "Christmas", "Wedding", etc. Based on the selected genre, selectable list items 512 are shown to allow selection of a background track. The background tracks may include an image, a play button, a title, descriptive keywords, composer/producer, and a description of the length of the background track. In an alternative embodiment, the musical genre and background track may be selected on separate screens.

Figure 5C:
FIG. 5C illustrates an exemplary user interface that may be used in some embodiments for selection of one or more topics.

FIG. 5C illustrates an exemplary user interface that may be used in some embodiments for selection of one or more topics. In an exemplary interface, a selection of topics may be displayed to the user. A label 521 is shown to prompt the user to select one or more topics. A search field 522 is displayed and allows the user to enter search queries to find desired topics. In response to receiving a search query in the search field 522 and submission of the query, the computer system 101 may search for topics matching the search query and display them on the screen. The interface displays a set of selected topics 523, such as love, hate, and time, which the user has selected through interface actions, such as tapping or clicking. The interface displays a set of suggested topics 524, which the user may select through interface actions. In this embodiment, the user may select the topics by tapping or clicking on the plus mark on the topic to cause it to be selected, which is denoted by a change of color. Suggested topics may be determined based on previously entered inputs such as the musical genre and background track. The suggested topics may be determined by artificial intelligence, machine learning-based algorithms or based on a rules-based system. In some embodiments, the computer system accepts as input free text, such as arbitrary words or phrases, as topics.

Figure 5D:
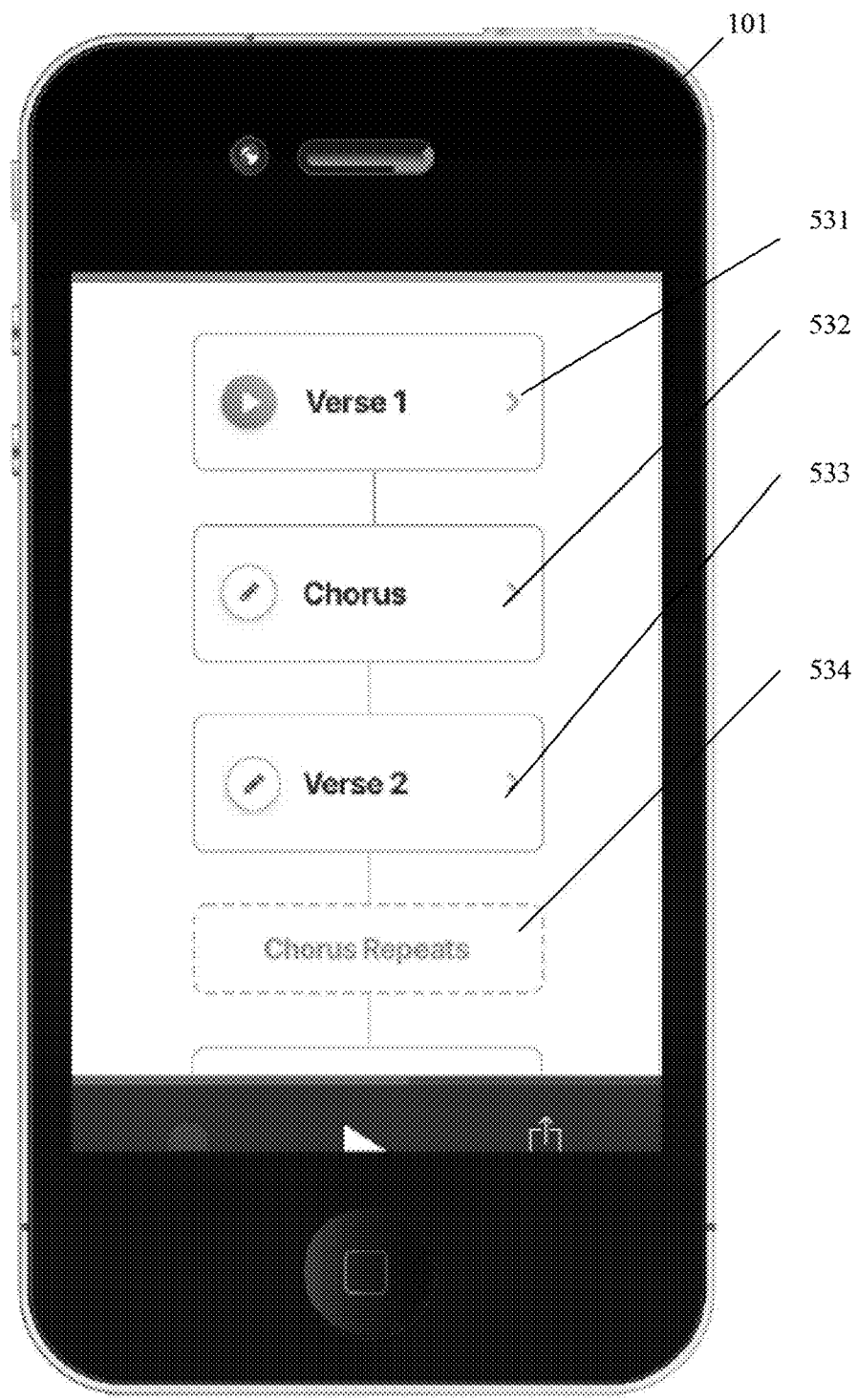
FIG. 5D illustrates an exemplary user interface that may be used in some embodiments for selection of a part of a song.

FIG. 5D illustrates an exemplary user interface that may be used in some embodiments for selection of a part of a song. In an exemplary interface, the parts of a song may be displayed to the user. As shown, these parts may be, for example, verse 1 (531), chorus (532), verse 2 (533), and a repeat of the chorus (534). Verse 1 (531) is shown as being already generated by the song creation system and so displays a play button for playing the verse 1 (531). Meanwhile, the chorus (532) and verse 2 (533) have not yet been generated. The user may select, such as by tapping or clicking, any of verse 1 (531), chorus (532), and verse 2 (533) to edit that part of the song. The indicator of repeat of the chorus (534) shows that the chorus repeats. The indicator 534 does not allow editing because it is simply a repeat of the chorus that is entered via the chorus button 532.

Figure 5E:
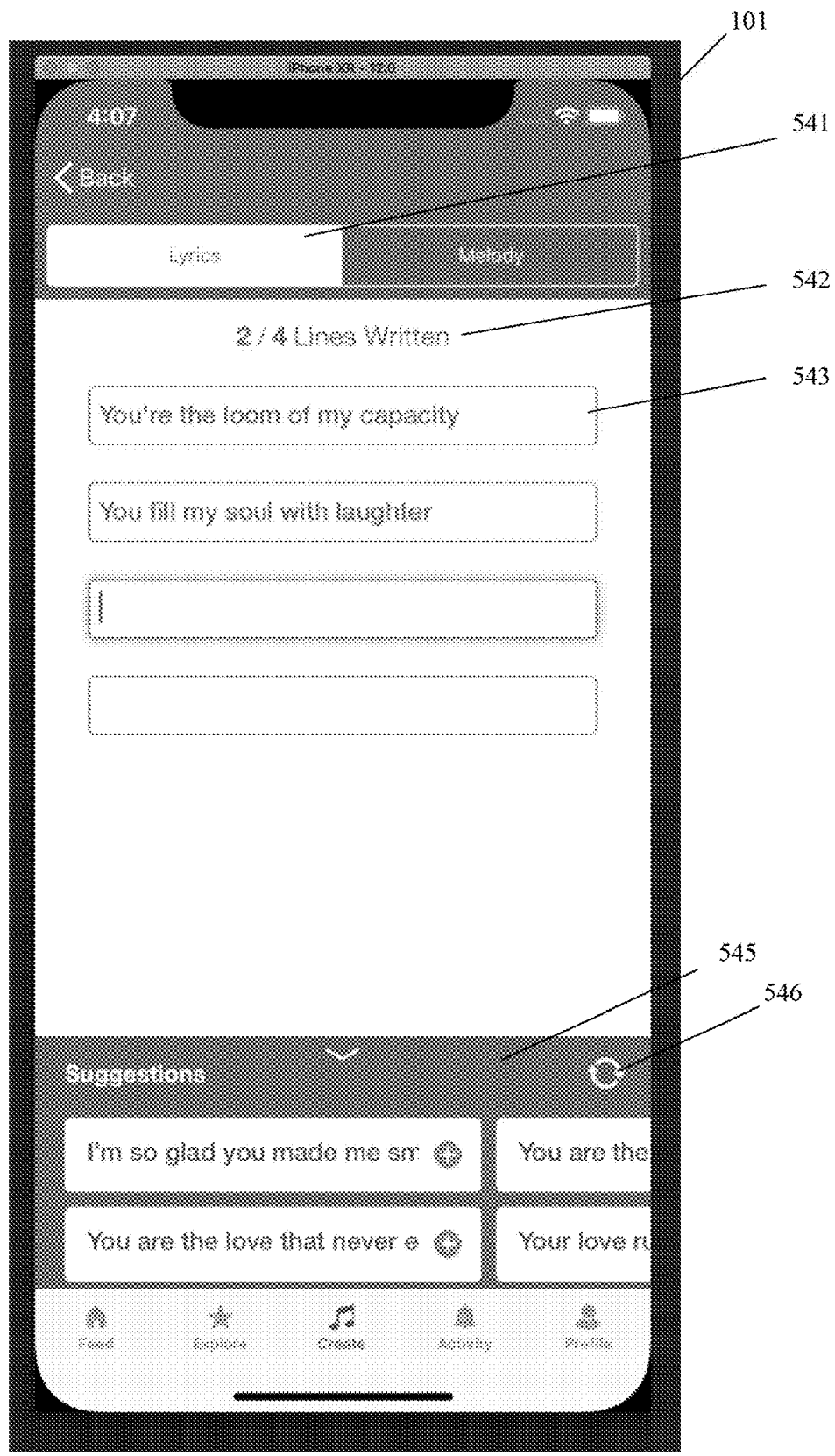
FIG. 5E illustrates an exemplary user interface that may be used in some embodiments for generating and receiving input lyrics.

FIG. 5E illustrates an exemplary user interface that may be used in some embodiments for generating and receiving input lyrics. The interface allows for entering lyrics for one part of a song, with the assistance of computer generated lyrics at the bottom of the screen. In an exemplary interface, selector buttons 541 at the top of the screen allow for switching between editing the lyrics and the melody. A label 542 shows the number of lines of the lyrics that have been written for this part of the song. Text fields 543 show lines of lyrics that have been received from the user. In one embodiment, additional lines may be received as text input from the user. In other embodiments, selection elements or menus may be used for selecting lyrics to add instead of text entry fields. Any of the computer generated suggestions may impact any of the lyrics generated by the system. A refresh button 546 allows the user to refresh the lyrics suggestions on the screen.

A window 545 shows lyrics suggestions generated by the computer system 101. The lyrics suggestions may be generated using any of the techniques described herein. The lyrics suggestions are shown with a user interface element, such as a plus sign, to allow adding them to the current set of lyrics 543. In another embodiment, the lyric suggestion interface elements are draggable from the suggestion window into the selected lyrics container. Moreover, the lyric suggestion interface elements may be dragged to different positions in order to rearrange the order of lyrics. When an additional line of lyrics is added by the user using button 544, then the lyrics suggestions are updated to account for the newly added lyrics. The lyrics suggestions window 545 may be refreshed with new suggested lyrics after lyrics are added by the user.

Figure 5F:
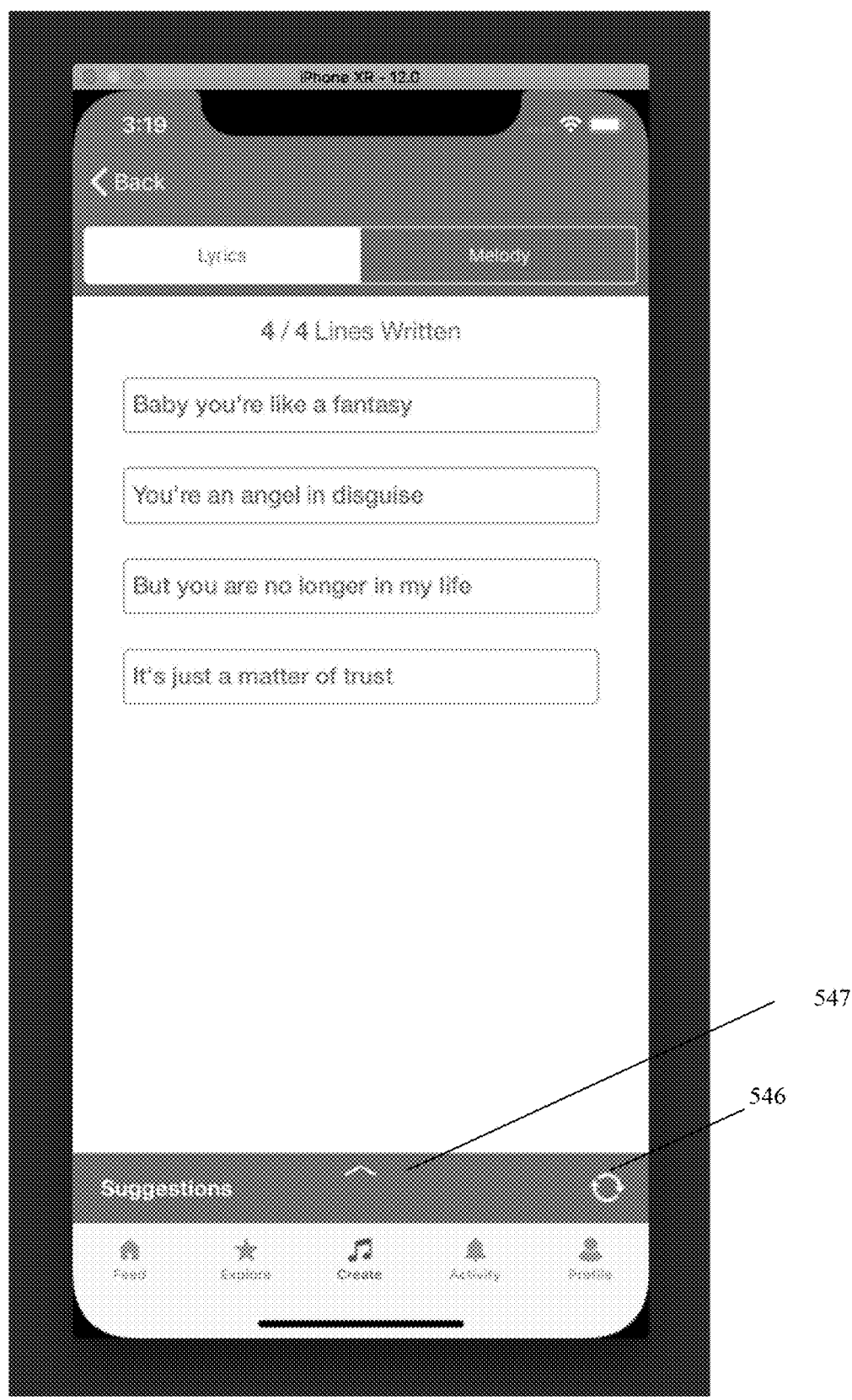
FIG. 5F illustrates an exemplary user interface that may be used in some embodiments for generating and receiving input lyrics.

FIG. 5F illustrates another exemplary user interface that may be used in some embodiments for generating and receiving lyrics. A refresh button 546 allows the user to refresh the lyrics suggestions to a new set of suggestions. When the user presses the refresh button, the computer system 101 may generate a new set of suggested lyrics. The computer system may take into account the fact that the user does not like any of the existing suggestions and therefore may generate suggestions that are intentionally different from those that were previously displayed. Also, the suggestion window 547 may optionally be collapsible and expandable as shown in the exemplary embodiment.

Figure 5G:
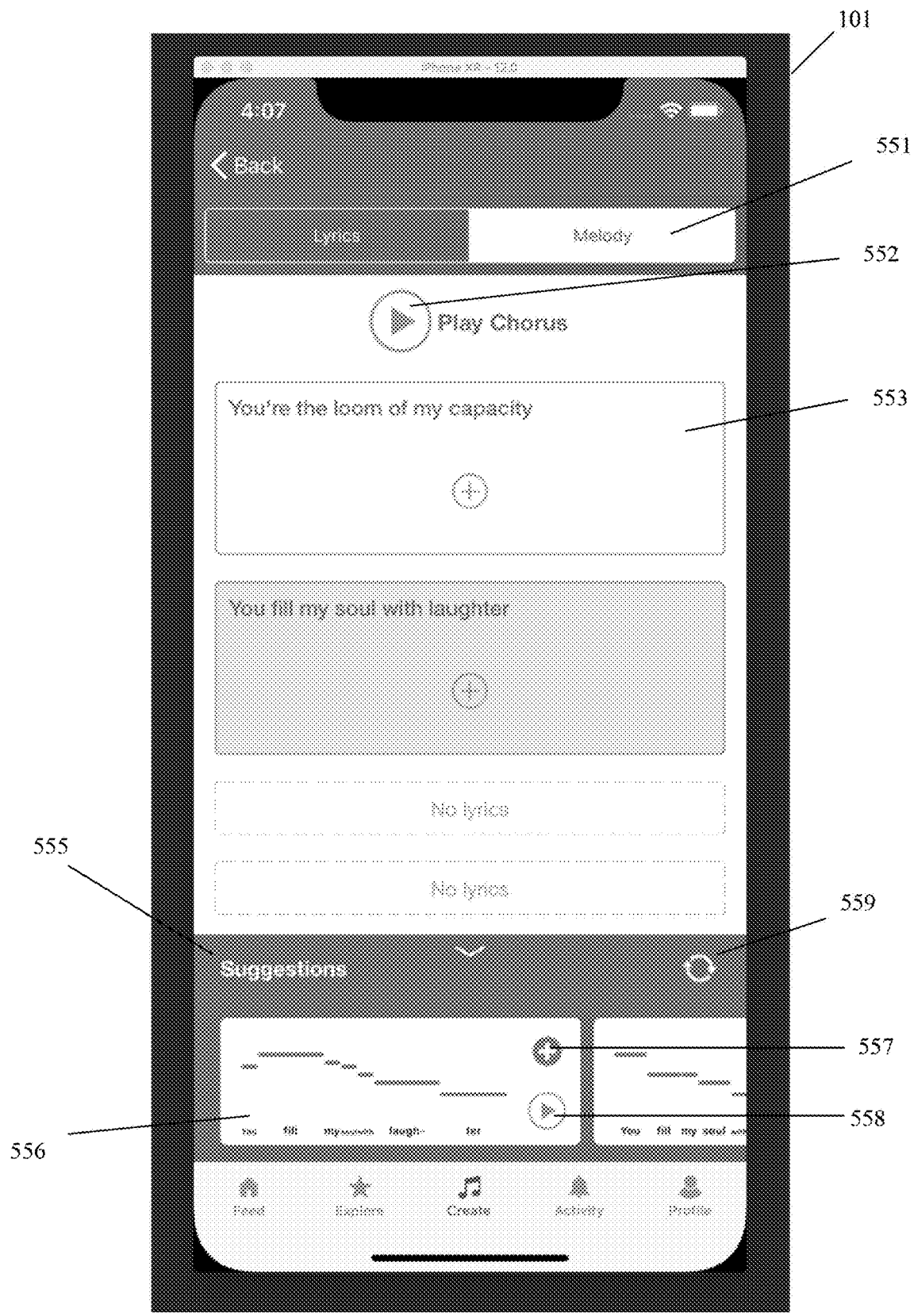
FIG. 5G illustrates an exemplary user interface that may be used in some embodiments for selection of melodies to correspond to the lyrics.

FIG. 5G illustrates an exemplary user interface that may be used in some embodiments for selection of melodies to correspond to the lyrics. In an embodiment, the melodies interface may be accessed by selector button 551 that allows switching between the lyrics and the melodies. In one embodiment, melodies may be chosen per line of a song. In other embodiments, a melody may be chosen for an entire part of the song that encompasses multiple lines. A play button 552 allows playing all of the melodies for the current song part. Interface element 553 shows the melody corresponding to one line of the song. The melody may be illustrated using horizontal lines to show the notes, with higher lines representing higher notes and lower lines representing lower notes, and the length of the lines indicating how long the note is held. When no melody has been selected for the lyrics, the melody space may be blank with a button that may be pressed to select a new melody to add. The lyrics for the line may also be displayed. The melody may be played instrumentally or with a computer-synthesized voice. The interface element 553 may be repeated for other lines of the song.

A window 555 may show melody suggestions that have been generated by the computer system 101 and may be selected by the user. In an embodiment, a melody suggestion 556 includes a visual display of the melody as described above, and a display of the lyrics that correspond to each note. The lyrics may be shown per note. In addition, a plus button 557 may be used to add the melody to the song, such as by filling in an empty spot for a melody or replacing an existing melody. Moreover, the melodies may be draggable from the suggestion window 555 into the upper part of the screen for selected melodies. Also, the melodies may be dragged for reordering within the song. A play button 558 may allow playing the melody suggestion. The melody may be played instrumentally or with a computer-synthesized voice. A refresh button 559 allows the user to refresh the melody suggestions on the screen. When the user presses the refresh button, the computer system 101 may generate a new set of suggested melodies. The computer system may take into account the fact that the user does not like any of the existing suggestions and therefore may generate suggestions that are intentionally different from those that were previously displayed.

Figure 6A:
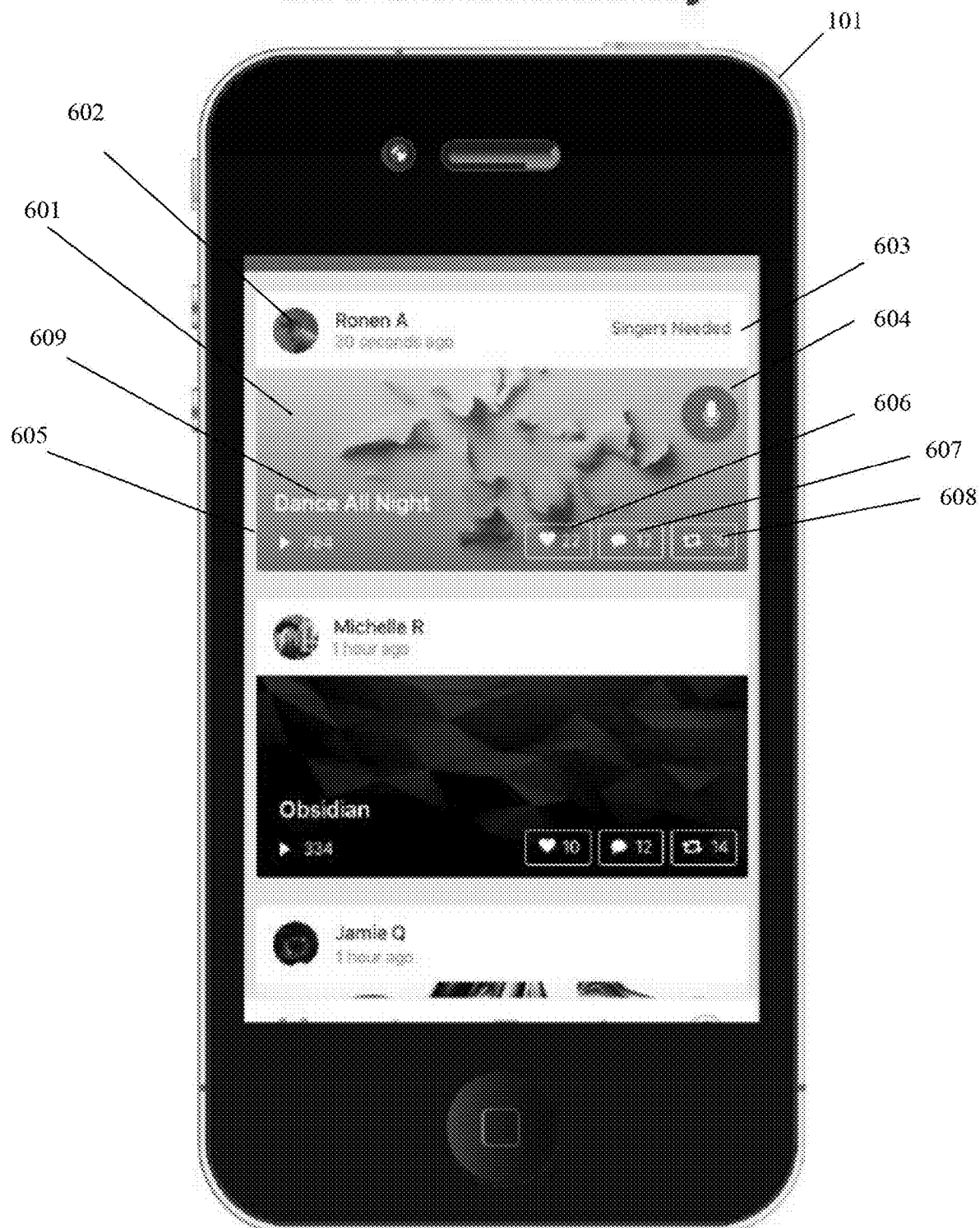
FIG. 6A illustrates an exemplary user interface that may be used in some embodiments to display a community for sharing songs.

FIG. 6A illustrates an exemplary user interface that may be used in some embodiments to display a community for sharing songs. The interface may be driven by community client 112, which connects over a network to an online community 121 of a remote server. The community client 112 may exchange data with online community 121, both uploading data to the online community 121 and downloading data from the online community 121. In an embodiment, the client 112 allows the user to optionally upload songs created by the song creation system 111 to the online community 121.

In an embodiment, a song 601 on the online community may be displayed. The song may have an identifier of an associated user 602 who uploaded the song. The song may optionally include an indicator of singers needed 603, which may indicate that the song has not been sung, has fewer than a desired number of singers, or that the creator of the song desires to have additional vocal versions of the song. A microphone button 604 may also indicate that the song needs singers and, in response to pressing the button, the computer system 101 may display an interface for the user to sing the song. Various labels may be displayed. A indicator of the number of plays 605 may be shown, to indicate the number of times that users have played the song. An indicator of the number of likes 606 of the song may be shown. Receiving a tap or press on the indicator may add a like to the song. An indicator of the number of comments 607 may be shown. Receiving a tap or press on the indicator may allow the user to add a comment. An indicator of the number of shares 608 may be shown. A share may comprise sharing the song on social media, via shared online folders, via chat, via email, or by other sharing mechanisms. In addition, users may have personal feeds showing a timeline of activity, and a share from the user may cause the song to be displayed on the personal feed. Receiving a tap or press on the indicator may allow the user to share the song. A title of the song 609 may also be displayed. Multiple additional songs may also be displayed and may have the same or similar fields.

Figure 6B:
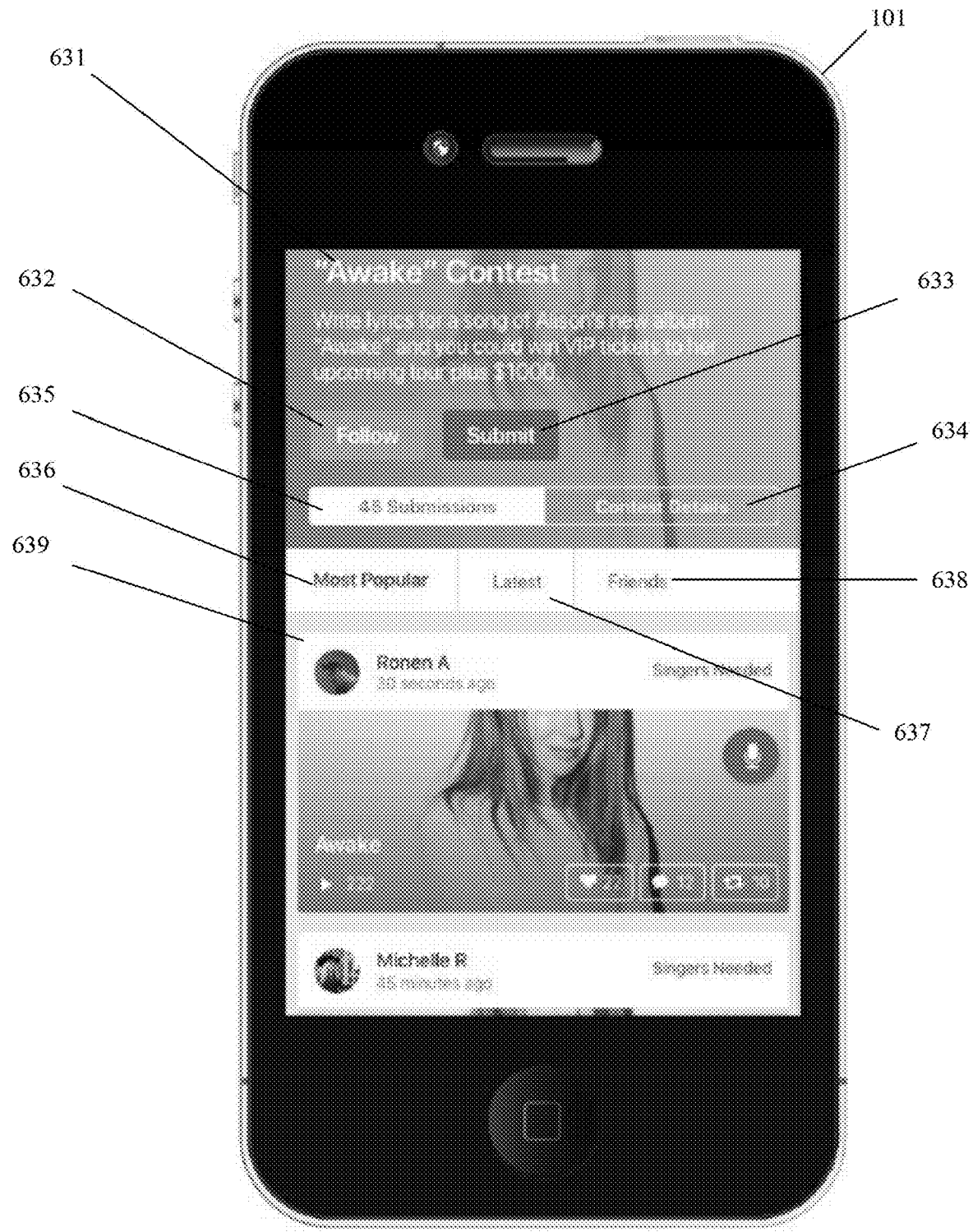
FIG. 6B illustrates an exemplary user interface that may be used in some embodiments to display an online contest.

FIG. 6B illustrates an exemplary user interface that may be used in some embodiments to display an online contest. The interface may driven by community client 112, which may also connect to and display online contest 122. The community client 112 may exchange data with the online contest 122, both uploading data to the online contest 122 and downloading data from the online contest 122. In an embodiment, the client 112 allows the user to optionally upload songs created by the song creation system 111 to the online contest 122.

In some embodiments, an online contest may be sponsored by a host. The host may be a business or entity that would like to develop a new song, such as a jingle or theme. In some embodiments, the song may be for promoting a new product or service. The host may offer a reward to users for their songs, and may offer prizes for one or more songs that are selected. In other embodiments, online contests may be hosted by community members, such as other users, or may be hosted by the owner or creator of the online community platform. Online contests may or may not have a reward associated with them. Rewards may be monetary or non-monetary. In some embodiments, in-app badges may be awarded as rewards. The winners of the online contest may be selected by the creator of the online contest or by popular vote from other users in the community, and in some embodiments, the winners may be ranked such as first, second, third, and so on, and honorable mentions.

In an embodiment, a contest description 631 may be displayed, including a title and description. A follow button 632 allows users to add themselves to a list of users following the contest. Followers of the contest may receive updates and messages about the contest from the contest creator. For example, followers may receive updates about the deadline for the contest and an update to announce the winner of the contest. A submit button 633 allows the user to submit a song to the contest. Submitted songs may be transmitted from the song creation system 111 to the online contest 122, and the winning song may be selected from those songs that were submitted before a contest deadline. A contest details button 634 may cause the computer system 101 to display further details about the contest. A submissions indicator 635 may show the number of song submissions that have currently been received.

Additional user interface elements allow viewing other aspects of the contest. A most popular button 636 may cause the display of the most popular songs submitted to the contest, when selected. A latest button 637 may cause the display of the latest songs submitted to the contest. A friends button 638 may cause the display of songs submitted to the contest by friends, or songs that were submitted that were liked, comment on, shared, or interacted with by friends. Friends may be other users who are connected to the user as a friend in the online community 121 or contest 122. The display of songs 639 may be shown, similar to as described with reference to FIG. 6A.

Additional embodiments and variations related to the above may also be used, as will be described below.

In one embodiment, the songs that are generated by song creation system 111 are micro-songs. Micro-songs are short pieces of music that are much shorter than typical songs. Micro-songs may have vocals or may be entirely instrumental. In some embodiments, micro-songs are less than 10 seconds, 20 seconds, 30 seconds, 40 seconds, 50 seconds, one minute, or one minute and 30 seconds. In some embodiments, micro-songs have at most 2 lines, 4 lines, 6 lines, 8 lines, 10 lines, 12 lines, 14 lines, or 16 lines. In some embodiments, micro-songs have at most 1 verse, 2 verses, 3 verses, or 4 verses. A micro-song may be viewed analogously to the micro-blogging phenomenon popularized by twitter. Micro-blogs are very short versions of blogs, and micro-songs are likewise very short versions of songs.

In one embodiment, the songs that are generated by song creation system 111 are full-length songs, which may be defined as songs that are longer than any type of micro-song generated by the song creation system 111. Full-length songs are pieces of music defined, for example, as being longer than a micro-song. A full-length song may be a complete song that has a duration in the range of typical songs. Full-length songs may have vocals or may be entirely instrumental. In some embodiments, full-length songs are longer than one minute and 30 seconds. In some embodiments, full-length songs have 10 or more lines. In some embodiments, full-length songs have 5 or more song parts. The song creation system 111 may generate a full-length song based on a micro-song according to the embodiments disclosed herein. In some embodiments, the song creation system 111 may use at least one of a lyric(s), a melody(s), a genre(s), a background track(s) and a topic(s) of a micro-song to generate a full-length song. The song creation system 111 may generate a micro-song based on a full-length song according to the embodiments disclosed herein. In some embodiments, the song creation system 111 may use at least one of a lyric(s), a melody(s), a genre(s), a background track(s) and a topic(s) of a full-length song to generate a micro-song. The song creation system 111 may generate two versions of differing length of the same song according to the embodiments disclosed herein. In some embodiments, the song creation system 111 may use at least one of a lyric(s), a melody(s), a genre(s), a background track(s) and a topic(s) to generate both a micro-song version and a full-length song version of the same song.

In one embodiment, background tracks may be recorded and uploaded to the computer system 101 by a user. Rather than being pre-stored, the background track may be recorded by the microphone 104 of the computer system 101. In some embodiments, the computer system 101 may display an interface for the user to upload a background track. The uploaded background track may be stored and then be selected for incorporation as a background track into songs by the user who uploaded the song, or by all users of the app. In other embodiments, the notes of the background track may be selected from a database, or generated by a computer algorithm, and presented to the user. The computer system 101 may then start recording from the microphone 104 and prompt the user to play the notes, in order to generate the recording of the background track. The background track may then be used in the song creation process as described above.

In one embodiment, the melody of one or more parts of the song may be recorded and uploaded to the computer system 101 by a user. Rather than being pre-stored, the melody may be recorded by the microphone 104 of the computer system 101. In some embodiments, the computer system 101 may display an interface for the user to upload melodies. The uploaded melodies may be stored and then be selected for incorporation as melodies into songs. In other embodiments, the notes of the melody may be selected from a database, or generated by a computer algorithm, and presented to the user. The computer system 101 may then start recording from the microphone 104 and prompt the user to play the notes, in order to generate the recording of the melody. The melody may then be used in the song creation process as described above.

In one embodiment, the computer system 101 presents an interface for creating music videos to correspond to the song. The computer system 101 may display options of music videos that the user may select to go with the song. In one embodiment, the selection of a music video is one of the parameters used in method 300, and therefore may be used as one of the parameters used to generate other parameters, such as the lyrics, melody, and background track. Also, the music video may be a parameter generated from the other previously input parameters. The music video may be created by animation or by video of the real-world. Moreover, in some embodiments, the music video may be created by stitching together shorter segments of video that may be generated or selected to fit certain portions of a song. In some embodiments, the music video, or a portion of it, may be created by recording video of the user singing the song in karaoke mode, such as through a video camera of the computer system 101. In one embodiment, the vocal recording is made separately from the music video, to allow the user to use the a phone video camera to create the video to go with the song. This allows the user to make a video without being required to sing at the same take. In some embodiments, the music video may be recorded in chunks, with portions recorded in different locations and at different times. In one embodiment, video and audio of the vocal recording can be captured concurrently.

In one embodiment, the computer system 101 presents an interface allowing the user to edit melodies. By allowing the user to edit melodies, additional customization options are provided. In one embodiment, melodies are visually displayed as sets of horizontal lines, such as shown in FIG. 5F. In an embodiment, the visual depiction of a melody is interactive. The lines may be dragged up and down to become higher or lower notes and may be dragged horizontally to be extended and be held longer or shrunk to be held for a shorter time. The lines may be dragged by a tap and drag action or by clicking and dragging.

For example, in one approach, a first user interaction event is detected on a line representing a note. The first user interaction event causes the line to be selected. A second user interaction event is then detected to drag the line up or down, which causes the line to become a higher pitched note (if higher) or a lower pitched note (if lower). The pitch of the note may be proportional to how high or low the note is in the visual chart. A third user interaction event is then detected to drag an end of the line to become longer or shorter, which causes the note to be held longer (if longer) or shorter (if shorter). The time that the note is held may be proportional to the length of the line.

In one embodiment, a speech synthesis system is used to synthetically generate a singing voice to sing the lyrics to the song. This may be referred to as a singing synthesizer. For example, the synthesis may be used to generate a vocal track for the song. In an embodiment, the vocal track may be generated in response to a selection of a type of voice for the vocal track of the song (e.g. a computer-synthesized voice and/or a user's voice) may be used in method 200 at optional step 206 or in method 400 at optional step 416. The lyrics of the song and the melody may be input to the singing synthesizer, and the singing synthesizer may generate a vocal track that sings the lyrics according to the desired melody. The singing synthesizer may accept options like male or female voice. The synthesized vocal track may then be added to the song to create a complete song with melody, background track, and vocal track.

In some embodiments, some or all portions of the song creation process may be personalized to the user by using a machine learning model that is trained on the user's past interactions, or the interactions of other users similar to the user, with the song creation system 111. Any of the processes where selectable options are displayed to the user, such as musical genres, background tracks, topics, parts of songs, lyrics, or melodies, may be personalized through machine learning.

A monitoring system of the song creation system 111 may track the user's interactions and store a log of behavior that may be used for training the machine learning model. When a user takes an action, such as selecting an item, like a topic, this may be used to train the machine learning model to increase the likelihood that the item, or items similar to it, is recommended, suggested, or shown in the future. However, when a user skips over an item, such as not selecting an item, then this may be used to teach the machine learning model to make it less likely to recommend, suggest, or show the item in the future.

For example, if user selects a particular lyric for a song, then in future songs, the machine learning model may be more likely to suggested that lyric, or similar lyrics, to the user. Moreover, the machine learning model may display the lyrics, or similar lyrics, more prominently, such as higher up in a ranked list of lyrics. However, lyrics that are repeatedly not selected by the user, or lyrics that are similar, may be less likely to be suggested to the user over time. Similarly, the lyrics that are not selected, or lyrics that are similar, may be displayed less prominently such as lower in a ranked list of lyrics. The same processes for making it more, or less, likely to display an item or to rank an item higher, or lower, may be used for items such as musical genres, background tracks, topics, parts of songs, lyrics, and melodies.

Figure 7:
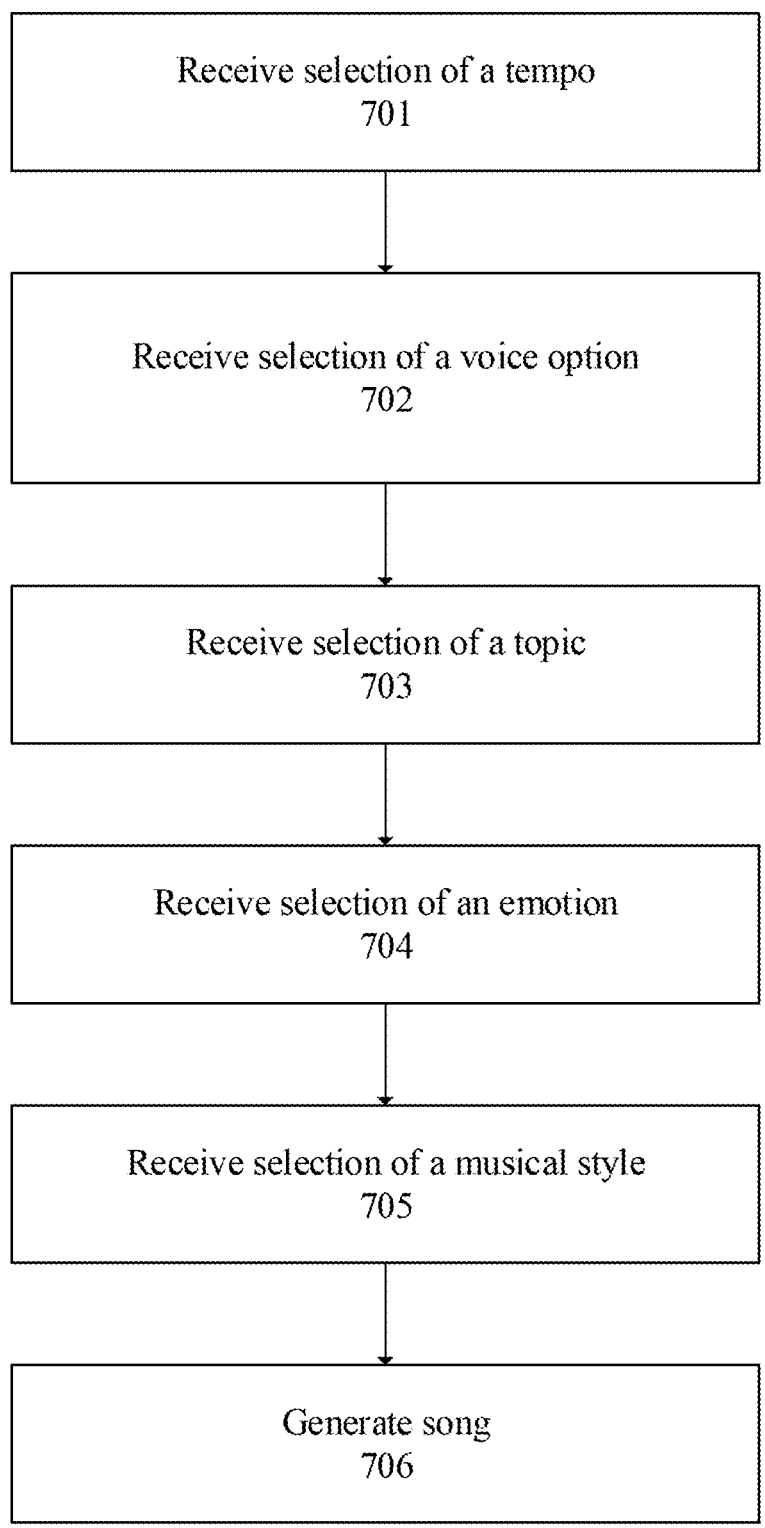
FIG. 7 illustrates an exemplary method that may be used in some embodiments for generating a song based on set of configuration elements.

FIG. 7 illustrates an exemplary method 700 that may be used in some embodiments for generating a song based on set of configuration elements. In an embodiment, a method 700 may be used to quickly generate a vocal song based solely on the selection of one or more parameters. The number and type of parameters may vary, but in some embodiments, the parameters may include tempo, male/female voice, topic, emotion, and musical style (such as musical genre). Other embodiments may have more or fewer parameters, and the parameters may be selected in any order. Any of the parameters may be received by free text inputs, selections, such as from a set of options or drop-down menu, voice inputs, gesture inputs, or any other form of input. Based on the selection of the parameters, song creation system 111 may automatically generate a song including a vocal track without additional user interactions beyond the initial inputs or parameter selections. The song may be generated by an artificial intelligence, machine learning-based system or by a rule-based system using deterministic rules.

In exemplary method 700, in step 701, the computer system 101 receives selection of a tempo. In step 702, the computer system 101 receives selection of a voice option. In an embodiment, a voice option may be for a user selection of a male and/or female voice, or multiple voices (such as stylistic voices associated with certain musical genres). For example, as shown in FIG. 3C, the computer system 101 provides one or more options to generate one or more vocal tracks based on a selected computer-synthesized voice(s) in response to the user selecting an option 326 to generate a computer-synthesized vocal(s). A computer-synthesized voice may be provided by the computer system 101 according to a selectable male voice tone 322 and/or a selectable female voice tone 324. In step 703, the computer system 101 receives selection of a topic. In step 704, the computer system 101 receives selection of an emotion. In step 705, the computer system 101 receives selection of a musical style. In step 706, the computer system 101 may generate the vocal song, including the background track, melody, and lyrics. In some embodiments, the computer system 101 may use a speech synthesizer (or singing synthesizer) to generate the vocal track according to a computer-synthesized voice or may use the karaoke mode to capture a vocal track from the user. In an embodiment, as shown in FIG. 3C, while the karaoke mode is selected by the user in order to capture the vocal track from the user, the computer system 101 may display a user interface portion for a duet mode 320 as part of the karaoke mode interface 305. According to the duet mode 320, the computer system 101 concurrently plays back a computer-synthesized vocal track to the user while the vocal track sung by the user is being captured in the karaoke mode. Such concurrent playback of the computer-synthesized vocal track with audio of the user's vocal track captured in the karaoke mode results in generating a song that sounds like a duet between the user and the computer-synthesized voice(s). In an embodiment, the computer system 101 may detect selection of the option 326 to generate a vocal track of a computer-synthesized voice(s) singing the song. Based on selection of the option 326, the computer system 101 may use artificial intelligence, a machine learning-based system or a rule-based system using deterministic rules to match any of the parameters described herein (e.g. musical genre(s), background track(s), topic(s), a song part(s), lyric(s), melody(s), tempo(s), male/female voice(s), multiple voices, topic(s) and/or emotion(s)) to generate a computer-synthesized vocal(s) of one or more pre-defined voice tones singing the song in accordance with the parameters. It is understood that the one or more pre-defined voice tones may be associated with one or more human voice sounds. In addition, according to an embodiment, one or more enhancements may be applied to a vocal track of a recorded human voice or a computer-synthesized voice singing a song. Such enhancements may be, for example, reverb, delay, various types of equalizations (EQ), chipmunk voice effect and monster voice effect.

Figure 8:
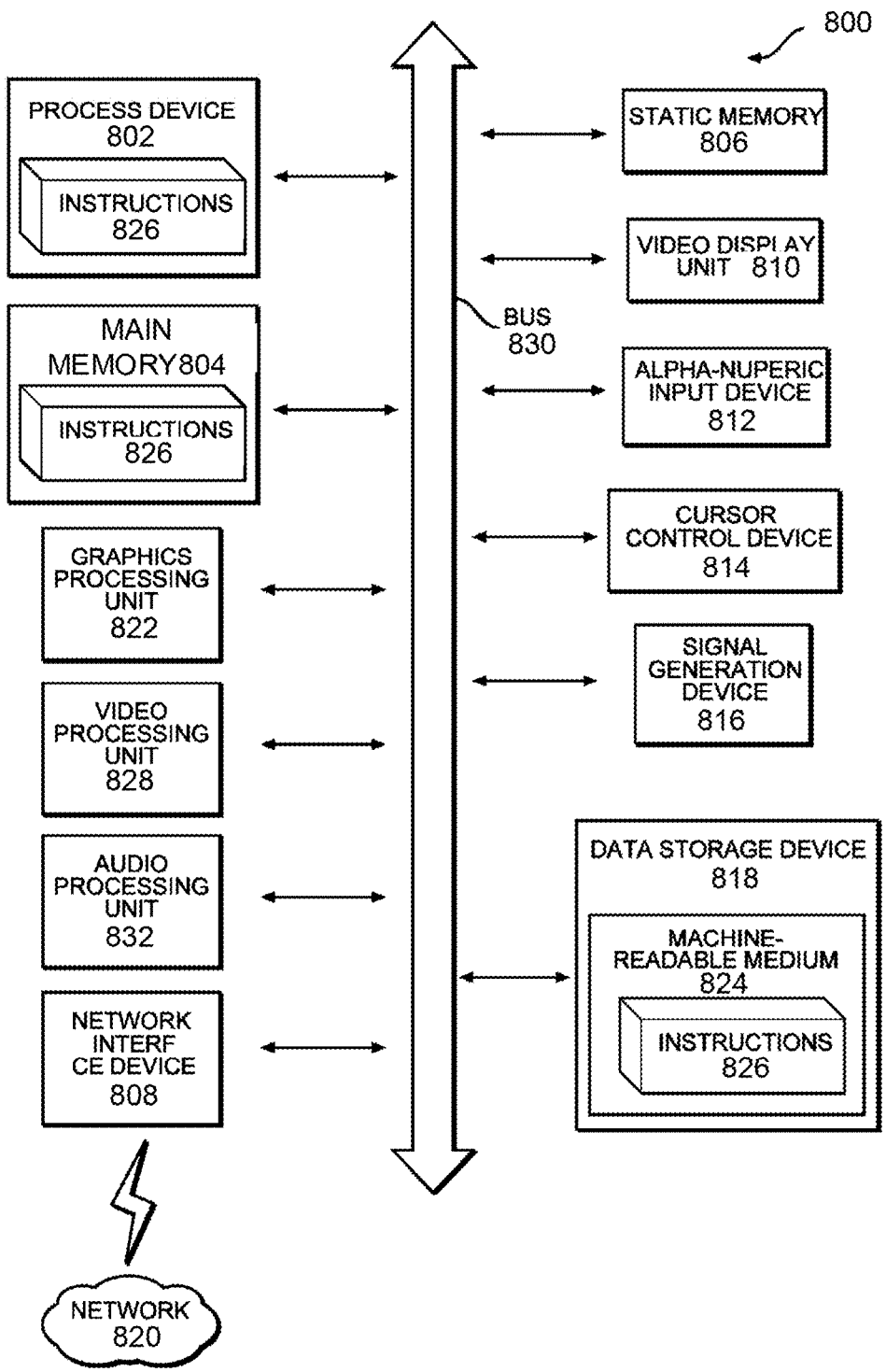
FIG. 8 illustrates an example a computer system that may be used in some embodiments.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 815 (e.g., a mouse), a graphics processing unit 822, a signal generation device 816 (e.g., a speaker), video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to the components of a device to perform the disclosure herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for generating a song comprising:
   receiving selection of a musical genre, a background track, and a topic from a user;
   generating a set of suggested lyrics based on the selected musical genre, selected background track, and selected topic, and displaying the suggested lyrics;
   repeatedly receiving input of one or more lyrics from the user and re-generating the set of suggested lyrics based on the input lyrics, until a set of lyrics for the song is received;
   generating a set of melodies based on the selected musical genre, selected background track, selected topic, and received set of lyrics;
   receiving a selection of a melody from the set of melodies;
   combining the selected melody, selected background track, and received set of lyrics to create the song;
   playing the song.

2. The computer-implemented method of claim 1, further comprising:
   displaying a karaoke screen that displays corresponding lyrics as the song is played;
   receiving, by a microphone, audio input;
   storing the audio input as the vocal track of the song.

3. The computer-implemented method of claim 1, further comprising:
   computer generating, by a singing synthesizer, a vocal track to sing the lyrics of the song.

4. The computer-implemented method of claim 1, wherein the song is a micro-song having a duration 1.5 minutes or less.

5. The computer-implemented method of claim 1, wherein the selected background track is an upload of a recorded background track.

6. The computer-implemented method of claim 1, further comprising:
displaying a user interface for editing the selected melody;
receiving edits to the selected melody;
modifying the selected melody according to the received edits.

7. The computer-implemented method of claim 1, further comprising:
uploading the song to an online community.

8. The computer-implemented method of claim 1, further comprising:
uploading the song to an online contest.

9. A computer-implemented method for generating a song comprising:
displaying options for selection of a musical genre on a screen of a computer system;
receiving selection of a musical genre, from the display musical genre options, from a user;
displaying options for selection of a background track on a screen of a computer system;
receiving selection of a background track, from the displayed background track options, from the user, wherein the selected background track is associated with one or more parts of the song;
displaying options for selection of a topic on a screen of a computer system;
receiving selection of a topic, from the displayed topic options, from the user;
displaying the one or more parts of the song;
receiving a selection of one of the parts for editing by the user;
displaying one or more user interface elements for inputting a line of the song;
generating a set of suggested lyrics based on the selected musical genre, selected background track, and selected topic, and displaying the suggested lyrics;
repeatedly receiving input of at least one line of the song from the user and re-generating the set of suggested lyrics based on the input line from the user, until a set of lyrics for the selected one or more parts of the song is received;
generating a set of melodies based on the selected musical genre, selected background track, selected topic, and received set of lyrics;
displaying options for selection of a melody, from the set of melodies, on a screen of a computer system;
receiving selection of a melody from the user, wherein the selected melody is included in the set of melodies and further associated with one or more parts of the song;
saving the song to a database.

10. The computer-implemented method of claim 9, further comprising:
displaying a karaoke screen that displays corresponding lyrics as the song is played;
receiving, by a microphone, audio input;
storing the audio input as the vocal track of the song.

11. The computer-implemented method of claim 9, further comprising:
computer generating, by a singing synthesizer, a vocal track to sing the lyrics of the song.

12. The computer-implemented method of claim 9, wherein the song is a micro-song having a duration of 1.5 minutes or less.

13. The computer-implemented method of claim 9, wherein the selected background track is an upload of a recorded background track.

14. The computer-implemented method of claim 9, further comprising:
displaying a user interface for editing the selected melody;
receiving edits to the selected melody;
modifying the selected melody according to the received edits.

15. The computer-implemented method of claim 9, further comprising:
uploading the song to an online community.

16. The computer-implemented method of claim 9, further comprising:
uploading the song to an online contest.

17. The computer-implemented method of claim 9, wherein the generated set of suggested lyrics is based on all or some of the previous lyrics in the song.

18. The computer-implemented method of claim 9, wherein the generated set of melodies is based on all or some of the previous melodies in the song.

19. The computer-implemented method of claim 9, wherein receiving selection of a topic further includes receiving a user provided topic received via free text inputs.

* * * * *